(12) United States Patent
Yang

(10) Patent No.: US 11,405,403 B2
(45) Date of Patent: Aug. 2, 2022

(54) METHOD AND DEVICE, AND SERVER AND TERMINAL FOR PROCESSING NETWORK RESOURCE ACCESS

(71) Applicant: Hangzhou Jindoutengyun Technologies Co., Ltd., Hangzhou (CN)

(72) Inventor: Yang Yang, Hangzhou (CN)

(73) Assignee: Hangzhou Jindoutengyun Technologies Co., Ltd., Hangzhou (CN)

( * ) Notice: Subject to any disclaimer, the term of this patent is extended or adjusted under 35 U.S.C. 154(b) by 0 days.

(21) Appl. No.: 17/535,733

(22) Filed: Nov. 26, 2021

(65) Prior Publication Data

US 2022/0182390 A1 Jun. 9, 2022

(30) Foreign Application Priority Data

Dec. 7, 2020 (CN) .......................... 202011413791.2

(51) Int. Cl.
*H04L 9/40* (2022.01)
*H04L 47/80* (2022.01)
*H04L 47/78* (2022.01)

(52) U.S. Cl.
CPC .......... *H04L 63/102* (2013.01); *H04L 47/781* (2013.01); *H04L 47/808* (2013.01); *H04L 63/083* (2013.01); *H04L 63/20* (2013.01)

(58) Field of Classification Search
CPC ... H04L 63/102; H04L 47/781; H04L 47/808; H04L 63/083; H04L 63/20
See application file for complete search history.

(56) References Cited

U.S. PATENT DOCUMENTS

| 7,870,294 B2* | 1/2011 | Braddy | G06Q 30/0601 709/227 |
| 9,405,813 B1* | 8/2016 | Qian | H04N 21/25825 |
| 2003/0097443 A1* | 5/2003 | Gillett | H04L 65/4084 709/219 |

(Continued)

FOREIGN PATENT DOCUMENTS

| CN | 105306587 A | 2/2016 |
| CN | 106446617 A | 2/2017 |

*Primary Examiner* — El Hadji M Sall
(74) *Attorney, Agent, or Firm* — PROI Intellectual Property US; Klaus Michael Schmid

(57) ABSTRACT

The invention relates to the technical field of network security, in particular to a method and device for processing network resource access, a server and a terminal. The purpose is to improve network security. The technical scheme is: receiving a first access request for a target network resource, generating a second access request corresponding to the first access request according to a preset corresponding relationship, and transmitting (directly or indirectly, the same below) to a target network resource server; receiving a first response returned by the target network resource server according to the second access request (directly or indirectly, the same below), and converting the first response to generate information in an image coding format as second response information content; generating a second response according to the second response information content as a response to the first access request, and transmitting (directly or indirectly) to a user terminal.

21 Claims, 9 Drawing Sheets

(56) References Cited

U.S. PATENT DOCUMENTS

| | | | |
|---|---|---|---|
| 2004/0193683 A1* | 9/2004 | Blumofe | H04L 65/607 |
| | | | 709/204 |
| 2008/0319857 A1* | 12/2008 | Dobbins | H04L 63/102 |
| | | | 705/30 |
| 2013/0086380 A1* | 4/2013 | Krishnaswamy | H04L 63/102 |
| | | | 713/168 |

* cited by examiner

METHOD AND DEVICE, AND SERVER AND TERMINAL FOR PROCESSING NETWORK RESOURCE ACCESS

BACKGROUND OF THE INVENTION

1. Technical Field

The invention relates to the technical field of network security, in particular to a method and device for processing network resource access, a server and a terminal.

2. Description of Related Art

At present, in the field of network application security, attackers often use automated tools to collect information of network applications, analyze and utilize various vulnerabilities in core software programs, related software components, infrastructures such as platform for business applications and operating systems, and finally illegally obtain data or destroy the usability of network applications.

In order to protect network applications, the mainstream solution is to analyze and filter the content and behavioral characteristics of network access requests and responses, which has the disadvantages that it can only be used to target against identified problems/vulnerabilities; that is, firstly, it is necessary to have a good understanding of existing problems/vulnerabilities and attack means before effective protection can be carried out, which requires high protection ability and protection cost, and some problems/vulnerabilities may be missed; and secondly, it is unable to effectively prevent undiscovered problems/vulnerabilities, only passive responses can be given.

BRIEF SUMMARY OF THE INVENTION

In view of the above problems, the purpose of the invention is to provide a method and device for processing network resource access, a server and a terminal to improve network security.

In order to achieve the above purpose, the invention is realized through the following technical scheme:

In an aspect of the invention, a method for processing network resource access comprises:

receiving a first access request for a target network resource, generating a second access request corresponding to the first access request according to a preset corresponding relationship, and transmitting (directly or indirectly, the same below) to a target network resource server;

receiving a first response returned (directly or indirectly, the same below) by the target network resource server according to the second access request, and converting the first response to generate information in an image coding format as second response information content; and generating a second response according to the second response information content as a response to the first access request, and transmitting (directly or indirectly, the same below) to a user terminal;

Preferably, converting the first response to generate information in an image coding format specifically comprises:

acquiring first response information, presenting the first response information with a corresponding presentation tool according to the type of the target network resource or the data type and content of the first response information, and generating the information in the image coding format according to presented content.

Preferably, generating a second response according to the second response information content specifically comprises:

generating corresponding second response information after associating the second response information content with corresponding attributes such as transmitter, receiver and content category; and encapsulating the aforementioned second response information (for example, adding information for network transmission such as network communication transmission format and session information) to generate the corresponding second response.

Preferably, generating a second access request corresponding to the first access request according to a preset corresponding relationship specifically comprises:

acquiring first access request information; determining one or more of an actual address, request method and processing logic of the target network resource corresponding to the first access request according to a corresponding relationship determined by a system built-in, local administrator or third party configuration, and converting the first access request information according to the one or more items determined above to generate second access request information; and generating the second access request according to the second access request information, that is, encapsulating the aforementioned second access request information (for example, adding information for network transmission such as network communication transmission format and session information) to generate the corresponding second access request.

Preferably, generating a second access request corresponding to the first access request according to a preset corresponding relationship may also comprise: after merging a plurality of associated sub-access requests in the first access request, acquiring merged request information; determining one or more of an actual address, request method and processing logic of the target network resource corresponding to the first access request according to a corresponding relationship determined by a system built-in, local administrator or third party configuration, and converting the merged request information according to the one or more items determined above to generate second access request information; and generating the second access request according to the second access request information, that is, encapsulating the aforementioned second access request information (for example, adding information for network transmission such as network communication transmission format and session information) to generate the corresponding second access request.

Preferably, generating a second access request corresponding to the first access request according to a preset corresponding relationship may also comprise: acquiring first access request information; determining one or more of an actual address, request method and processing logic of the target network resource corresponding to the first access request according to a corresponding relationship determined by a system built-in, local administrator or third party configuration, converting the first access request information according to the one or more items determined above, and decomposing the converted information to obtain second access request information containing a plurality of pieces of associated sub-access request information; and generating the second access request according to the second access request information, that is, encapsulating the aforementioned second access request information (for example, adding information for network transmission such as network communication transmission format and session information) to generate the corresponding second access request.

Preferably, the processing method further comprises:

acquiring a user action for the second response information initiated by a user through a user terminal;

converting the user action to generate a third access request, and transmitting (directly or indirectly, the same below) to the target network resource server;

converting a third response returned (directly or indirectly, the same below) by the target network resource server according to the third access request to generate an action response; and transmitting (directly or indirectly, the same below) the action response to the user terminal as a response to the user action.

Preferably, converting the user action to generate a third access request specifically comprises:

capturing the user action and acquiring user action information;

simulating and executing the user action on the first response information presented by the corresponding presentation tool according to the user action information, and applying the action to the first response information correspondingly;

generating third access request information according to a user action simulation result; and generating the third access request according to the third access request information, that is, encapsulating the third access request information (for example, adding information for network transmission such as network communication transmission format and session information) to generate the third access request.

Preferably, the user action information comprises an action type and an action position.

Preferably, converting a third response returned by the target network resource server according to the third access request to generate an action response specifically comprises:

receiving the third response and acquiring third response information; presenting the third response information with a corresponding presentation tool according to the type of the target network resource or the data type and content of the first response information or a data type and content of the third response information, and generating information in an image coding format according to the presented content as action response information content; generating the action response according to the action response information content, that is, generating corresponding action response information after associating the action response information content with corresponding attributes such as transmitter, receiver and content category; and encapsulating the aforementioned action response information (for example, adding information for network transmission such as network communication transmission format and session information) to generate the corresponding action response.

Preferably, converting a third response returned by the target network resource server according to the third access request to generate an action response may also comprise: receiving the third response and acquiring third response information; merging the third response information and the first response information, presenting the merged information with a corresponding presentation tool according to the type of the target network resource or the data type and content of the first response information or a data type and content of the third response information or a data type and content of the merged information, and generating information in an image coding format according to the presented content as action response information content; generating the action response according to the action response information content, that is, generating corresponding action response information after associating the action response information content with corresponding attributes such as transmitter, receiver and content category; and encapsulating the aforementioned action response information (for example, adding information for network transmission such as network communication transmission format and session information) to generate the corresponding action response.

Preferably, converting a third response returned by the target network resource server according to the third access request to generate an action response may also comprise: receiving the third response and acquiring third response information; merging the third response information and the first response information, presenting the merged information with a corresponding presentation tool according to the type of the target network resource or the data type and content of the first response information or a data type and content of the third response information or a data type and content of the merged information, generating information in an image coding format according to the presented content, comparing the information in the image coding format with the second response information content, and taking the difference between the two as action response information content; generating the action response according to the action response information content, that is, generating corresponding action response information after associating the action response information content with corresponding attributes such as transmitter, receiver and content category; and encapsulating the aforementioned action response information (for example, adding information for network transmission such as network communication transmission format and session information) to generate the corresponding action response.

Preferably, the processing method further comprises:

acquiring a first update for the first response initiated by the target network resource server; and converting the first update to generate a corresponding second update for the second response information content, and transmitting (directly or indirectly, the same below) to the user terminal.

Preferably, converting the first update to generate a corresponding second update for the second response information content specifically comprises:

receiving the first update and acquiring first update information; presenting the first update information with a corresponding presentation tool according to the type of the target network resource or the data type and content of the first response information or a data type and content of the first update information, and generating information in an image coding format according to the presented content as second update information content; generating the second update according to the second update information content, that is, generating corresponding second update information after associating the second update information content with corresponding attributes such as transmitter, receiver and content category; and encapsulating the aforementioned second update information (for example, adding information for network transmission such as network communication transmission format and session information) to generate the corresponding second update.

Preferably, converting the first update to generate a corresponding second update for the second response information content may also comprise: receiving the first update and acquiring first update information; merging the first update information and the first response information, presenting the merged information with a corresponding presentation tool according to the type of the target network resource or the data type and content of the first response information or a data type and content of the first update information or a data type and content of the merged information, and generating information in an image coding format according to the presented content as second update information content; generating the second update according to the second update information content, that is, generating corresponding second update information after associating the second update information content with corresponding attributes such as transmitter, receiver and content category; and encapsulating the aforementioned second update information (for example, adding information for network transmission such as network communication transmission format and session information) to generate the corresponding second update.

Preferably, converting the first update to generate a corresponding second update for the second response information content may also comprise: receiving the first update and acquiring first update information; merging the first update information and the first response information, presenting the merged information with a corresponding presentation tool according to the type of the target network resource or the data type and content of the first response information or a data type and content of the first update information or a data type and content of the merged information, generating information in an image coding format according to the presented content, comparing the information in the image coding format with the second response information content, and taking the difference between the two as second update information content; generating the second update according to the second update information content, that is, generating corresponding second update information after associating the second update information content with corresponding attributes such as transmitter, receiver and content category; and encapsulating the aforementioned second update information (for example, adding information for network transmission such as network communication transmission format and session information) to generate the corresponding second update.

Preferably, generating information in an image coding format according to the presented content specifically comprises:

drawing or projecting the presented content to form the information in the image coding format.

In another aspect of the invention, a device for processing network resource access comprises a memory and a processor which communicate with each other, and a computer program stored in the memory and capable of running on the processor, and the processor executes the aforementioned method when running the computer program.

In another aspect of the invention, a method for processing network resource access applied to a network resource server comprises:

receiving a first access request for a target network resource, and generating a second access request corresponding to the first access request according to a preset corresponding relationship;

generating a first response according to the second access request;

converting the first response to generate information in an image coding format as second response information content;

generating a second response according to the second response information content as a response to the first access request, and transmitting (directly or indirectly, the same below) to a user terminal;

Preferably, converting the first response to generate information in an image coding format specifically comprises:

acquiring first response information, presenting the first response information with a corresponding presentation tool according to a type of the target network resource or a data type and content of the first response information, and generating the information in the image coding format according to presented content.

Preferably, generating a second response according to the second response information content specifically comprises:

generating corresponding second response information after associating the second response information content with corresponding attributes such as transmitter, receiver and content category; and encapsulating the aforementioned second response information (for example, adding information for network transmission such as network communication transmission format and session information) to generate the corresponding second response.

Preferably, generating a second access request corresponding to the first access request according to a preset corresponding relationship specifically comprises:

acquiring first access request information; determining one or more of an actual address, request method and processing logic of the target network resource corresponding to the first access request according to a corresponding relationship determined by a system built-in, local administrator or third party configuration, and converting the first access request information according to the one or more items determined above to generate second access request information; and generating the second access request according to the second access request information, that is, encapsulating the aforementioned second access request information (for example, adding information for network transmission such as network communication transmission format and session information) to generate the corresponding second access request.

Preferably, generating a second access request corresponding to the first access request according to a preset corresponding relationship may also comprise: after merging a plurality of associated sub-access requests in the first access request, acquiring merged request information; determining one or more of an actual address, request method and processing logic of the target network resource corresponding to the first access request according to a corresponding relationship determined by a system built-in, local administrator or third party configuration, and converting the merged request information according to the one or more items determined above to generate second access request information; and generating the second access request according to the second access request information, that is, encapsulating the aforementioned second access request information (for example, adding information for network transmission such as network communication transmission format and session information) to generate the corresponding second access request.

Preferably, generating a second access request corresponding to the first access request according to a preset corresponding relationship may also comprise: acquiring first access request information; determining one or more of an actual address, request method and processing logic of the target network resource corresponding to the first access request according to a corresponding relationship determined by a system built-in, local administrator or third party configuration, converting the first access request information according to the one or more items determined above, and decomposing the converted information to obtain second access request information containing a plurality of pieces of associated sub-access request information; and generating the second access request according to the second access request information, that is, encapsulating the aforementioned second access request information (for example, adding information for network transmission such as network communication transmission format and session information) to generate the corresponding second access request.

Preferably, the processing method further comprises:

acquiring a user action for the second response information initiated by a user through a user terminal;

converting the user action to generate a third access request;

converting a third response returned (directly or indirectly) according to the third access request to generate an action response; and transmitting (directly or indirectly) the action response to the user terminal as a response to the user action.

Preferably, converting the user action to generate a third access request specifically comprises:

capturing the user action and acquiring user action information;

simulating and executing the user action on the first response information presented by the corresponding presentation tool according to the user action information, and applying the action to the first response information correspondingly;

generating third access request information according to a user action simulation result; and generating the third access request according to the third access request information, that is, encapsulating the third access request information (for example, adding information for network transmission such as network communication transmission format and session information) to generate the third access request.

Preferably, the user action information comprises an action type and an action position.

Preferably, converting a third response returned according to the third access request to generate an action response specifically comprises:

acquiring third response information; presenting the third response information with a corresponding presentation tool according to the type of the target network resource or the data type and content of the first response information or a data type and content of the third response information, and generating information in an image coding format according to the presented content as action response information content; generating the action response according to the action response information content, that is, generating corresponding action response information after associating the action response information content with corresponding attributes such as transmitter, receiver and content category; and encapsulating the aforementioned action response information (for example, adding information for network transmission such as network communication transmission format and session information) to generate the corresponding action response.

Preferably, converting a third response returned according to the third access request to generate an action response may also comprise: acquiring third response information; merging the third response information and the first response information, presenting the merged information with a corresponding presentation tool according to the type of the target network resource or the data type and content of the first response information or a data type and content of the third response information or a data type and content of the merged information, and generating information in an image coding format according to the presented content as action response information content; generating the action response according to the action response information content, that is, generating corresponding action response information after associating the action response information content with corresponding attributes such as transmitter, receiver and content category; and encapsulating the aforementioned action response information (for example, adding information for network transmission such as network communication transmission format and session information) to generate the corresponding action response.

Preferably, converting a third response returned according to the third access request to generate an action response may also comprise: acquiring third response information; merging the third response information and the first response information, presenting the merged information with a corresponding presentation tool according to the type of the target network resource or the data type and content of the first response information or a data type and content of the third response information or a data type and content of the merged information, generating information in an image coding format according to the presented content, comparing the information in the image coding format with the second response information content, and taking the difference between the two as action response information content; generating the action response according to the action response information content, that is, generating corresponding action response information after associating the action response information content with corresponding attributes such as transmitter, receiver and content category; and encapsulating the aforementioned action response information (for example, adding information for network transmission such as network communication transmission format and session information) to generate the corresponding action response.

Preferably, the processing method further comprises:

converting the first update for the first response to generate a corresponding second update for the second response information content, and transmitting (directly or indirectly, the same below) to the user terminal.

Preferably, converting the first update for the first response to generate a corresponding second update for the second response information content specifically comprises:

after acquiring first update information, presenting the first update information with a corresponding presentation tool according to the type of the target network resource or the data type and content of the first response information or a data type and content of the first update information, and generating information in an image coding format according to the presented content as second update information content; generating the second update according to the second update information content, that is, generating corresponding second update information after associating the second update information content with corresponding attributes such as transmitter, receiver and content category; and encapsulating the aforementioned second update information (for example, adding information for network transmission such as network communication transmission format and session information) to generate the corresponding second update.

Preferably, converting the first update for the first response to generate a corresponding second update for the second response information content may also comprise: after acquiring first update information, merging the first update information and the first response information, presenting the merged information with a corresponding presentation tool according to the type of the target network resource or the data type and content of the first response information or a data type and content of the first update information or a data type and content of the merged information, and generating information in an image coding format according to the presented content as second update information content; generating the second update according to the second update information content, that is, generating corresponding second update information after associating the second update information content with corresponding attributes such as transmitter, receiver and content category; and encapsulating the aforementioned second update information (for example, adding information for network transmission such as network communication transmission format and session information) to generate the corresponding second update.

Preferably, converting the first update for the first response to generate a corresponding second update for the second response information content may also comprise: after acquiring first update information, merging the first update information and the first response information, presenting the merged information with a corresponding presentation tool according to the type of the target network resource or the data type and content of the first response information or a data type and content of the first update information or a data type and content of the merged information, generating information in an image coding format according to the presented content, comparing the information in the image coding format with the second response information content, and taking the difference between the two as second update information content; generating the second update according to the second update information content, that is, generating corresponding second update information after associating the second update information content with corresponding attributes such as transmitter, receiver and content category; and encapsulating the aforementioned second update information (for example, adding information for network transmission such as network communication transmission format and session information) to generate the corresponding second update.

Preferably, generating information in an image coding format according to the presented content specifically comprises:

drawing or projecting the presented content to form the information in the image coding format.

In another aspect of the invention, a server comprises a memory and a processor which communicate with each other, and a computer program stored in the memory and capable of running on the processor, and the processor executes the aforementioned method when running the computer program.

In another aspect of the invention, a method for processing network resource access applied to a user terminal comprises:

receiving a first access request for a target network resource, generating a second access request corresponding to the first access request according to a preset corresponding relationship, and transmitting (directly or indirectly, the same below) to a target network resource server;

receiving a first response returned (directly or indirectly, the same below) by the target network resource server according to the second access request, and converting the first response to generate information in an image coding format as second response information content; and generating a second response according to the second response information content as a response to the first access request.

Preferably, converting the first response to generate information in an image coding format specifically comprises:

acquiring first response information, presenting the first response information with a corresponding presentation tool according to a type of the target network resource or a data type and content of the first response information, and generating the information in the image coding format according to presented content.

Preferably, generating a second response according to the second response information content specifically comprises:

generating corresponding second response information after associating the second response information content with corresponding attributes such as transmitter, receiver and content category; and encapsulating the aforementioned second response information (for example, adding information for network transmission such as network communication transmission format and session information) to generate the corresponding second response.

Preferably, generating a second access request corresponding to the first access request according to a preset corresponding relationship specifically comprises:

acquiring first access request information; determining one or more of an actual address, request method and processing logic of the target network resource corresponding to the first access request according to a corresponding relationship determined by a system built-in, local administrator or third party configuration, and converting the first access request information according to the one or more items determined above to generate second access request information; and generating the second access request according to the second access request information, that is, encapsulating the aforementioned second access request information (for example, adding information for network transmission such as network communication transmission format and session information) to generate the corresponding second access request.

Preferably, generating a second access request corresponding to the first access request according to a preset corresponding relationship may also comprise: after merging a plurality of associated sub-access requests in the first access request, acquiring merged request information; determining one or more of an actual address, request method and processing logic of the target network resource corresponding to the first access request according to a corresponding relationship determined by a system built-in, local administrator or third party configuration, and converting the merged request information according to the one or more items determined above to generate second access request information; and generating the second access request according to the second access request information, that is, encapsulating the aforementioned second access request information (for example, adding information for network transmission such as network communication transmission format and session information) to generate the corresponding second access request.

Preferably, generating a second access request corresponding to the first access request according to a preset corresponding relationship may also comprise: acquiring first access request information; determining one or more of an actual address, request method and processing logic of the target network resource corresponding to the first access request according to a corresponding relationship determined by a system built-in, local administrator or third party configuration, converting the first access request information according to the one or more items determined above, and decomposing the converted information to obtain second access request information containing a plurality of pieces of associated sub-access request information; and generating the second access request according to the second access request information, that is, encapsulating the aforementioned second access request information (for example, adding information for network transmission such as network communication transmission format and session information) to generate the corresponding second access request.

Preferably, the processing method further comprises:

acquiring a user action for the second response information initiated by a user through a user terminal;

converting the user action to generate a third access request, and transmitting (directly or indirectly, the same below) to the target network resource server;

converting a third response returned (directly or indirectly, the same below) by the target network resource server according to the third access request to generate an action response as a response to the user action.

Preferably, converting the user action to generate a third access request specifically comprises:

capturing the user action and acquiring user action information;

simulating and executing the user action on the first response information presented by the corresponding presentation tool according to the user action information, and applying the action to the first response information correspondingly;

generating third access request information according to a user action simulation result; and generating the third access request according to the third access request information, that is, encapsulating the third access request information (for example, adding information for network transmission such as network communication transmission format and session information) to generate the third access request.

Preferably, the user action information comprises an action type and an action position.

Preferably, converting a third response returned by the target network resource server according to the third access request to generate an action response specifically comprises:

receiving the third response and acquiring third response information; presenting the third response information with a corresponding presentation tool according to the type of the target network resource or the data type and content of the first response information or a data type and content of the third response information, and generating information in an image coding format according to the presented content as action response information content; generating the action response according to the action response information content, that is, generating corresponding action response information after associating the action response information content with corresponding attributes such as transmitter, receiver and content category; and encapsulating the aforementioned action response information (for example, adding information for network transmission such as network communication transmission format and session information) to generate the corresponding action response.

Preferably, converting a third response returned by the target network resource server according to the third access request to generate an action response may also comprise: receiving the third response and acquiring third response information; merging the third response information and the first response information, presenting the merged information with a corresponding presentation tool according to the type of the target network resource or the data type and content of the first response information or a data type and content of the third response information or a data type and content of the merged information, and generating information in an image coding format according to the presented content as action response information content; generating the action response according to the action response information content, that is, generating corresponding action response information after associating the action response information content with corresponding attributes such as transmitter, receiver and content category; and encapsulating the aforementioned action response information (for example, adding information for network transmission such as network communication transmission format and session information) to generate the corresponding action response.

Preferably, converting a third response returned by the target network resource server according to the third access request to generate an action response may also comprise: receiving the third response and acquiring third response information; merging the third response information and the first response information, presenting the merged information with a corresponding presentation tool according to the type of the target network resource or the data type and content of the first response information or a data type and content of the third response information or a data type and content of the merged information, generating information in an image coding format according to the presented content, comparing the information in the image coding format with the second response information content, and taking the difference between the two as action response information content; generating the action response according to the action response information content, that is, generating corresponding action response information after associating the action response information content with corresponding attributes such as transmitter, receiver and content category; and encapsulating the aforementioned action response information (for example, adding information for network transmission such as network communication transmission format and session information) to generate the corresponding action response.

Preferably, the processing method further comprises:

acquiring a first update for the first response initiated by the target network resource server; and converting the first update to generate a corresponding second update for the second response information content.

Preferably, converting the first update to generate a corresponding second update for the second response information content specifically comprises:

receiving the first update and acquiring first update information; presenting the first update information with a corresponding presentation tool according to the type of the target network resource or the data type and content of the first response information or a data type and content of the first update information, and generating information in an image coding format according to the presented content as second update information content; generating the second update according to the second update information content, that is, generating corresponding second update information after associating the second update information content with corresponding attributes such as transmitter, receiver and content category; and encapsulating the aforementioned second update information (for example, adding information for network transmission such as network communication transmission format and session information) to generate the corresponding second update.

Preferably, converting the first update to generate a corresponding second update for the second response information content may also comprise: receiving the first update and acquiring first update information; merging the first update information and the first response information, presenting the merged information with a corresponding presentation tool according to the type of the target network resource or the data type and content of the first response information or a data type and content of the first update information or a data type and content of the merged information, and generating information in an image coding format according to the presented content as second update information content; generating the second update according to the second update information content, that is, generating corresponding second update information after associating the second update information content with corresponding attributes such as transmitter, receiver and content category; and encapsulating the aforementioned second update information (for example, adding information for network transmission such as network communication transmission format and session information) to generate the corresponding second update.

Preferably, converting the first update to generate a corresponding second update for the second response information content may also comprise: receiving the first update and acquiring first update information; merging the first update information and the first response information, presenting the merged information with a corresponding presentation tool according to the type of the target network resource or the data type and content of the first response information or a data type and content of the first update information or a data type and content of the merged information, generating information in an image coding format according to the presented content, comparing the information in the image coding format with the second response information content, and taking the difference between the two as second update information content; generating the second update according to the second update information content, that is, generating corresponding second update information after associating the second update information content with corresponding attributes such as transmitter, receiver and content category; and encapsulating the aforementioned second update information (for example, adding information for network transmission such as network communication transmission format and session information) to generate the corresponding second update.

Preferably, generating information in an image coding format according to the presented content specifically comprises:

drawing or projecting the presented content to form the information in the image coding format.

In another aspect of the invention, a terminal comprises a memory and a processor which communicate with each other, and a computer program stored in the memory and capable of running on the processor, and the processor executes the aforementioned method when running the computer program.

In another aspect of the invention, a device for processing network resource access comprises an information processing module and a communication module, wherein the communication module is configured to receive a first response returned (directly or indirectly, the same below) by a target network resource server, acquire first response information and transmit the first response information to the information processing module, encapsulate second response information transmitted by the information processing module to generate a second response, and transmit (directly or indirectly, the same below) the second response to a user terminal;

and the information processing module is configured to generate information in an image coding format according to the first response information as second response information content, generate second response information according to the second response information content, and then send the second response information to the communication module.

Preferably, generating information in an image coding format according to the first response information specifically comprises:

presenting the first response information with a corresponding presentation tool according to a type of the target network resource or a data type and content of the first response information, and generating the information in the image coding format according to presented content through projection.

Preferably, the communication module is further configured to receive a first access request for the target network resource, acquire first access request information and transmit the first access request information to the information processing module, encapsulate second access request information transmitted by the information processing module to generate a second access request, and transmit (directly or indirectly, the same below) the second access request to the target network resource server;

the information processing module is further configured to generate the second access request information according to the received first access request information and a preset corresponding relationship, and send the second access request information to the communication module;

and the first response is a response to the second access request.

Preferably, generating the second access request information according to the received first access request information and a preset corresponding relationship specifically comprises:

determining one or more of an actual address, request method and processing logic of the target network resource corresponding to the first access request according to a corresponding relationship determined by a system built-in, local administrator or third party configuration, and converting the first access request information according to the one or more items determined above to generate the second access request information.

Preferably, generating the second access request information according to the received first access request information and a preset corresponding relationship may also comprise: after merging a plurality of associated sub-access requests in the first access request, acquiring merged request information; determining one or more of an actual address, request method and processing logic of the target network resource corresponding to the first access request according to a corresponding relationship determined by a system built-in, local administrator or third party configuration, and converting the merged request information according to the one or more items determined above to generate the second access request information.

Preferably, generating the second access request information according to the received first access request information and a preset corresponding relationship may also comprise: determining one or more of an actual address, request method and processing logic of the target network resource corresponding to the first access request according to a corresponding relationship determined by a system built-in, local administrator or third party configuration, converting the first access request information according to the one or more items determined above, and decomposing the converted information to obtain second access request information containing a plurality of pieces of associated sub-access request information.

Preferably, the communication module is further configured to capture a user action initiated by a user through the user terminal for the second response information, acquire user action information and transmit the user action information to the information processing module, encapsulate third access request information transmitted by the information processing module to generate a third access request, and transmit (directly or indirectly, the same below) the third access request to the target network resource server;

and the information processing module is further configured to generate the third access request information according to the received user action information and send the third access request information to the communication module.

Preferably, generating the third access request information according to the received user action information specifically comprises:

simulating and executing the user action on the first response information presented by the corresponding presentation tool according to the user action information; and generating third access request information according to a user action simulation result.

Preferably, the communication module is further configured to receive a third response returned (directly or indirectly, the same below) by the target network resource server according to the third access request, acquire third response information and send the third response information to the information processing module, encapsulate action response information transmitted by the information processing module to generate an action response, and transmit (directly or indirectly, the same below) the action response to the user terminal;

and the information processing module is further configured to generate the corresponding action response information according to the received third response information and send the action response information to the communication module.

Preferably, generating the corresponding action response information according to the received third response information specifically comprises:

presenting the third response information with a corresponding presentation tool according to the type of the target network resource or the data type and content of the first response information or the data type and content of the third response information, and generating information in an image coding format according to the presented content as action response information content; and generating action response information according to the action response information content.

Preferably, generating the corresponding action response information according to the received third response information may also comprise: merging the third response information and the first response information, presenting the merged information with a corresponding presentation tool according to the type of the target network resource or the data type and content of the first response information or a data type and content of the third response information or a data type and content of the merged information, and generating information in an image coding format according to the presented content as action response information content; and generating action response information according to the action response information content.

Preferably, generating the corresponding action response information according to the received third response information may also comprise: receiving the third response and acquiring third response information; merging the third response information and the first response information, presenting the merged information with a corresponding presentation tool according to the type of the target network resource or the data type and content of the first response information or a data type and content of the third response information or a data type and content of the merged information, generating information in an image coding format according to the presented content, comparing the information in the image coding format with the second response information content, and taking the difference between the two as action response information content; and generating the action response according to the action response information content.

Preferably, the communication module is further configured to receive a first update initiated by the target network resource server for the first response, acquire first update information and transmit the first update information to the information processing module, encapsulate second update information transmitted by the information processing module to generate a second update, and transmit (directly or indirectly, the same below) the second update to the user terminal;

and the information processing module is further configured to generate the corresponding second update information according to the first update information and send the second update information to the communication module.

Preferably, generating the corresponding second update information according to the first update information specifically comprises:

presenting the first update information with a corresponding presentation tool according to the type of the target network resource or the data type and content of the first response information or a data type and content of the first update information, and generating information in an image coding format according to the presented content as second update information content; and generating the second update information according to the second update information content.

Preferably, generating the corresponding second update information according to the first update information may also comprise: merging the first update information and the first response information, presenting the merged information with a corresponding presentation tool according to the type of the target network resource or the data type and content of the first response information or a data type and content of the first update information or a data type and content of the merged information, and generating information in an image coding format according to the presented content as second update information content; and generating the second update information according to the second update information content.

Preferably, generating the corresponding second update information according to the first update information may also comprise: merging the first update information and the first response information, presenting the merged information with a corresponding presentation tool according to the type of the target network resource or the data type and content of the first response information or a data type and content of the merged information, generating information in an image coding format according to the presented content, comparing the information in the image coding format with the second response information content, and taking the difference between the two as second update information content; and generating the second update information according to the second update information content.

The invention has the advantages that: by using the processing method of the invention, the second response information content in the image coding format without the target network resource information is generated according to the first response information returned by the target network resource server and fed back to the user; that is, what the user actually visits (sees and operates) is not real interfaces of network resources, but projected images of network resources, which do not contain any actual information of network resources (such as location and components), so it is hard for attackers to use automated tools to capture and analyze the information of network resources, thus failing to launch effective attacks (Automated tools usually do not capture static pictures, even if they capture the projected images of network resources, due to the limitation of image recognition technologies, it is difficult to directly analyze the actual content of network resources, and because the current content of network resources cannot be accurately identified, it is hard for automated tools to conduct simulation, thus limiting the further actions of attackers.); in this way, network security is improved without affecting the actual experience of users.

DETAILED DESCRIPTION OF THE INVENTION

In order to make the purpose, technical scheme and advantages of the embodiments of the invention clearer, a clear and complete description will be made below in combination with the technical scheme in the embodiments of the invention. Obviously, the described embodiments are part of the embodiments of the invention, not all embodiments. Based on the embodiments of the invention, all other embodiments obtained by those of ordinary skill in the art without paying creative labor belong to the protection scope of the invention.

According to the invention, a response from a network resource is projected in real time to obtain information in an image coding format (projected image), which is presented to a user through a user terminal; the projected image seen by the user is consistent with the content seen by the user during direct access to the network resource, and the actual use experience of the user is not affected; besides, because the projected image does not contain any actual information of the network resource (such as location and components), it is hard for attackers to use automated tools to capture and analyze the information of the network resource, thus failing to launch effective attacks, so that network security is improved.

In addition, after the user operates on the projected image (for example, clicking, selecting or inputting characters), the method and/or device of the invention may obtain operation information and a corresponding operation position in time, and feed back corresponding response information in real time, so that the operation experience of the user is the same as that during direct access to the network resource, thus improving network security without affecting the user experience.

To facilitate understanding, here, the relationship between an access request, access request information and access request information content, and a response, response information and response information content is defined as follows:

The access request information is obtained by adding attributes such as transmitter, receiver and content category on the basis of the access request information content, and the access request is obtained by adding information for network transmission such as network communication transmission format and session information on the basis of the access request information. Similarly, the response information is obtained by adding attributes such as transmitter, receiver, and content category on the basis of the response information content, and the response is obtained by adding information for network transmission such as network communication transmission format and session information on the basis of the response information.

Figure 1:
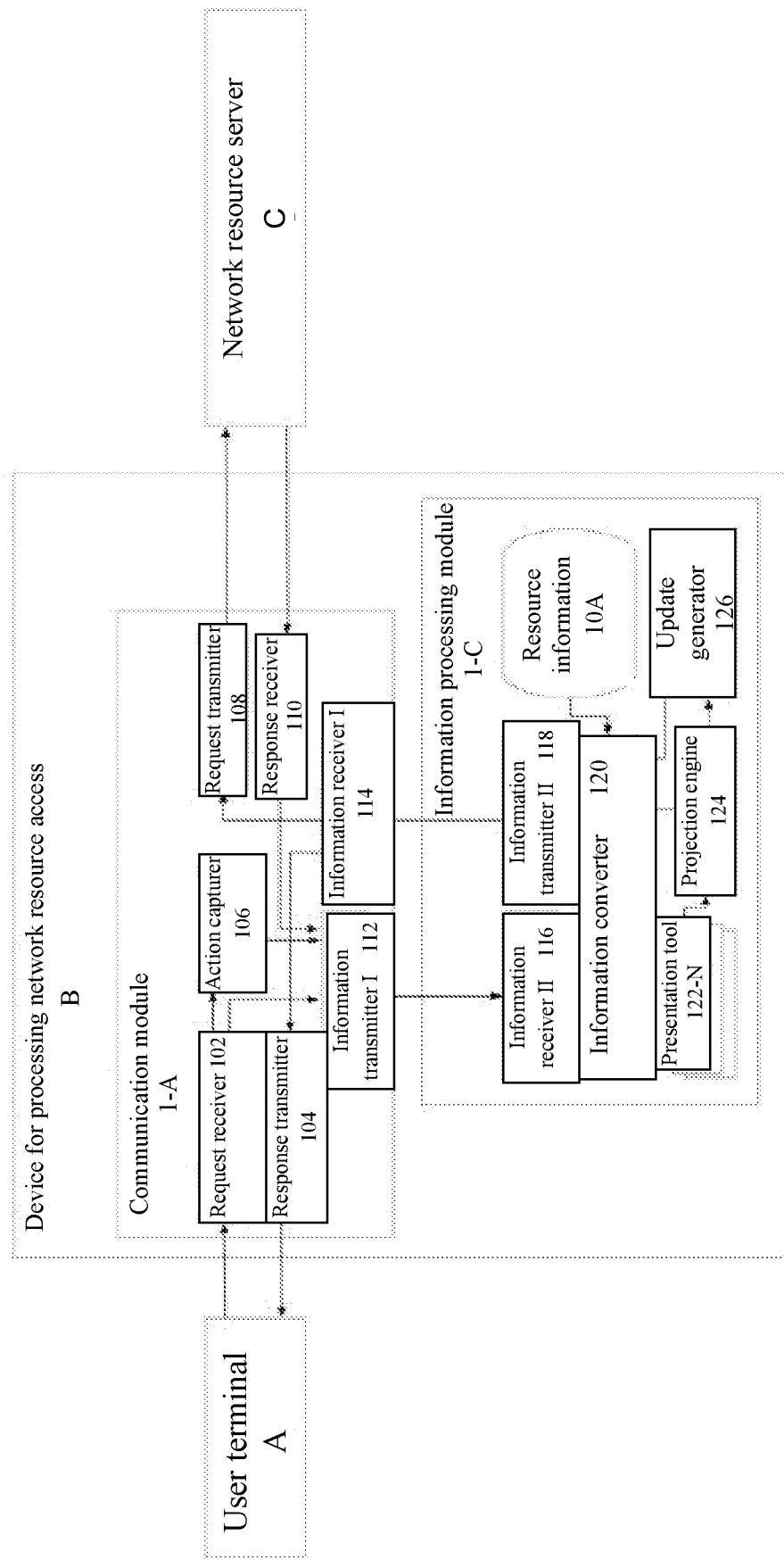
FIG. 1 is a structural diagram of a device for processing network resource access according to the invention.

As shown in FIG. 1, a device for processing network resource access B of this embodiment comprises an information processing module 1-C and a communication module 1-A.

The communication module 1-A is configured to receive a first response returned by a target network resource server C (directly from the target network resource server C or via a network proxy service), acquire first response information, and then transmit the first response information to the information processing module 1-C; that is, the communication module 1-A may not only directly receive the first response directly transmitted by the target network resource server C, but also receive the first response returned by the target network resource server C and transmitted via the network proxy service. In this example, the communication module 1-A receives the first response returned by the target network resource server C through a response receiver 110, acquires the first response information, and then transmits the first response information to the information processing module 1-C through an information transmitter I112.

The information processing module 1-C is configured to display first response information content with a corresponding presentation tool according to a data type and content in the received first response information, acquire information in an image coding format through drawing or projection according to the presented content as second response information content, associate the second response information content with corresponding attributes such as transmitter, receiver and content category, then generate corresponding second response information, and transmit the second response information to the communication module 1-A. Specifically, assuming that the first response information content is a dynamic web page (e.g., a dynamic web page based on JavaScript), after calling the corresponding presentation tool browser (e.g., Chrome, Firefox and Internet Explorer) to render and display the first response information content, the information in the image coding format is acquired through drawing or projection according to the presented content as the second response information content. In this example, the information processing module 1-C receives the first response information through an information receiver II116 and transmits the first response information to an information converter 120, the information converter 120 acquires the data type and content of the first response information, and calls the corresponding presentation tool 122-N to render and display the first response information content according to the data type, the presentation tool 122-N transmits the presented content to a projection engine 124, and the projection engine 124 conducts projection according to the presented content to obtain a dot matrix projected image (i.e., the aforementioned information in the image coding format); after acquiring the projected image from the projection engine 124, the information converter 120 associates the corresponding attributes such as the transmitter, receiver and content category, and then generates the corresponding second response information (the content of which is the aforementioned information in the image coding format); and the information converter 120 transmits the second response information to the communication module 1-A through an information transmitter II118.

As mentioned above, when the information processing module 1-C displays first response information content with a corresponding presentation tool according to a data type and content in the received first response information, acquires information in an image coding format through drawing or projection according to the presented content as second response information content, associates the second response information content with corresponding attributes such as transmitter, receiver and content category, and then generates corresponding second response information, the following schemes may also be adopted: a. the information converter 120 merges a plurality of pieces of associated sub-response information in the first response information, acquires a data type and content of the merged information, and calls the corresponding presentation tool 122-N according to the data type to render and display the content of the merged information; the presentation tool 122-N transmits the presented content to the projection engine 124, and the projection engine 124 conducts projection according to the presented content to acquire the dot matrix projected image (i.e., the aforementioned information in the image coding format); and after acquiring the projected image from the projection engine 124, the information converter 120 associates the corresponding attributes such as the transmitter, receiver and content category, and then generates the corresponding second response information (the content of which is the aforementioned information in the image coding format); b, if the data of the second response information content (projected image) is large, the following scheme is adopted: the information converter 120 acquires the data type and content of the first response information, and calls the corresponding presentation tool 122-N according to the data type to render and display the first response information content, the presentation tool 122-N transmits the presented content to the projection engine 124, and the projection engine 124 conducts projection according to the presented content to obtain the dot matrix projected image; and after acquiring the projected image from the projection engine 124, the information converter 120 decomposes the projected image (for example, segmenting it into a plurality of images) as the content of the plurality of pieces of associated sub-response information, then associates each image obtained after decomposition with the corresponding attributes such as transmitter, receiver and content category, and then generates the plurality of pieces of corresponding associated sub-response information as the second response information.

Of course, within the optional range of those skilled in the art, the information converter 120 may also be configured to display the first response information with a corresponding presentation tool according to a type of a target network resource.

The communication module 1-A is further configured to directly or indirectly send the second response information transmitted by the information processing module 1-C to a user terminal A. In this example, the communication module 1-A receives the second response information through an information receiver I114, and the second response information is encapsulated by a response transmitter 104 (for example, adding information for network transmission such as network communication transmission format and session information) to generate a corresponding second response as a response/reply to a first access request, and then directly sent to the user terminal A.

As a preferred implementation mode of this embodiment, the communication module 1-A is configured to be capable of receiving the first access request for the target network resource initiated by the user terminal A (the first access request is directly or indirectly sent by the user terminal A to the communication module 1-A) and transmitting the first access request to the information processing module 1-C. In this example, the communication module 1-A receives the first access request through a request receiver 102, acquires first access request information, and transmits the first access request information to the information processing module 1-C through an information transmitter I112.

The information processing module 1-C is configured to determine one or more of an actual address, request method and processing logic of the target network resource corresponding to the first access request according to a preset corresponding relationship (for example, the corresponding relationship between the target network resource and the device for processing network resource access), and perform information conversion according to the one or more items determined above, so as to convert the first access request information into second access request information. Specifically, the information converter 120 obtains the actual address of the target network resource according to the corresponding relationship between the target network resource and the device for processing network resource access B; and assuming that the actual address of the target network resource is Addr0, a resource type is Web application, and one needs to log in with a default account to get access to the target network resource, the device for processing network resource access B calls a browser corresponding to the Web application (e.g., Chrome) to generate second access request information pointing to Addr0 and completing the logic of logging in with the default account. In this example, the information processing module 1-C receives the first access request information through the information receiver II116 and transmits the first access request information to the information converter 120. After obtaining the corresponding relationship between the target network resource and the device for processing network resource access from resource information 10A, the information converter 120 completes the aforementioned information conversion to generate the second access request information, and transmits the second access request information to the communication module 1-A through the information transmitter II118.

As mentioned above, when determining one or more of an actual address, request method and processing logic of the target network resource corresponding to the first access request according to a preset corresponding relationship, and performing information conversion according to the one or more items determined above, so as to convert the first access request information into second access request information, the following two ways may also be adopted: a. according to the design and implementation of a system, an access request may be composed of multiple sub-access requests (multiple sub-access requests belonging to the same access request will not request different network resources), for example, the access request of a user terminal requesting access to a resource Y may comprise two sub-access requests, a first sub-access request is sending a resource name of the resource Y and requesting a one-time access token, a first sub-response is a one-time access token for accessing the resource Y within 30 seconds, and a second sub-access request is sending the one-time access token. In this case, after merging multiple associated sub-access requests or tasks in the first access request, the information converter 120 determines one or more of the actual address, request method and processing logic of the target network resource corresponding to the first access request according to a corresponding relationship determined by a system built-in, local administrator or third party configuration, and performs information conversion according to the one or more items determined above to generate the second access request information. The information converter 120 determines one or more of the actual address, request method and processing logic of the target network resource corresponding to the first access request according to the corresponding relationship determined by the system built-in, local administrator or third party configuration, performs information conversion according to the one or more items determined above (the conversion mode is as described above, and will not be repeated here), and decomposes the information obtained after conversion to generate the second access request information; and the second access request information contains a plurality of pieces of associated sub-access request information. For example, the device for processing network resource access B requests access to the resource Y, and performs decomposition to obtain two pieces of associated sub-access request information, first sub-access request information is requesting a one-time access token, first sub-response information is a one-time access token for accessing the resource Y within 30 seconds, and second sub-access request information is requesting access to the content of the resource Y. Here, the first sub-access request information and the second sub-access request information are collectively called the second access request information.

The communication module 1-A is further configured to directly or indirectly send the second access request information transmitted by the information processing module 1-C to the target network resource server C. In this example, the communication module 1-A receives the second access request information through the information receiver I114, and the second access request information is encapsulated by a request transmitter 108 (for example, adding information for network transmission such as network communication transmission format and session information) to generate a corresponding second access request, and then directly sent to the target network resource server C.

In practice, the user initiates the first access request for the target network resource through the user terminal A; after receiving the first access request, the communication module 1-A obtains the first access request information and transmits the first access request information to the information processing module 1-C; the information processing module 1-C generates the second access request information according to the preset corresponding relationship and the received first access request information, and sends the second access request information to the communication module 1-A; the communication module 1-A encapsulates the second access request information transmitted by the information processing module 1-C to generate the second access request, and sends the second access request to the target network resource server C; the network resource server C generates the first response according to the second access request and transmits the first response to the communication module 1-A; after receiving the first response, the communication module 1-A acquires the first response information and transmits the first response information to the information processing module 1-C; the information processing module 1-C displays the first response information content with the corresponding presentation tool according to the data type and content in the received first response information, acquires the information in the image coding format through drawing or projection according to the presented content as the second response information content, associates the second response information content with the corresponding attributes such as transmitter, receiver and content category, then generates the corresponding second response information, and sends the second response information to the communication module 1-A; and the communication module 1-A encapsulates the second response information transmitted by the information processing module 1-C to generate the second response, which is sent to the user terminal A to complete the whole access and response process.

As a preferred implementation mode of this embodiment, the response information of some network resources is essentially dynamic, such as video. In order to ensure that the user obtains the experience the same as direct access, in this implementation mode:

The communication module 1-A is also configured to be capable of receiving a first update initiated by the target network resource server C for the first response (directly or indirectly transmitted to the communication module by the target network resource server), acquiring first update information, and then transmitting the first update information to the information processing module 1-C. In this example, the communication module 1-A receives the first update directly transmitted from the target network resource server C through the response receiver 110, acquires the first update information, and then transmits the first update information to the information processing module 1-C through the information transmitter I112.

The information processing module 1-C is further configured to generate corresponding second update information according to the first update information and send the second update information to the communication module 1-A. Specifically, after obtaining the first update information, the information processing module 1-C incorporates the first update information into the first response information, calls a corresponding presentation tool according to a data type of the merged information to render and display the content of the merged information, acquires information in an image coding format through drawing or projection according to the presented content as second update information content, associates the second update information content with corresponding attributes such as transmitter, receiver and content category, and then generates the corresponding second update information. The user terminal A directly obtains an updated image without depending on a result of the second response information. In this example, the information processing module 1-C receives the first update information through the information receiver II116 and transmits the first update information to the information converter 120. The information converter 120 incorporates the first update information into the first response information to obtain the merged information, calls the corresponding presentation tool 122-N according to the data type of the merged information to render and display the content of the merged information, the presentation tool 122-N transmits the presented content to the projection engine 124, and the projection engine 124 conducts projection according to the presented content to obtain a dot matrix projected image (information in the image coding format) as the second updated information content. After acquiring the projected image from the projection engine 124, the information converter 120 associates the corresponding attributes such as the transmitter, receiver and content category to generate the corresponding second update information, which is sent to the communication module 1-A through the information transmitter II118. Within the optional range of those skilled in the art, the information converter 120 may also be configured to display the merged information with a corresponding presentation tool according to the target network resource type or the data type and content of the first response information or a data type and content of the first update information.

As mentioned above, when the information processing module 1-C generates the corresponding second update information according to the first update information, the following scheme may be adopted: a. the information processing module 1-C receives the first update information through the information receiver II116 and transmits the first update information to the information converter 120; the information converter 120 incorporates the first update information into the first response information to obtain the merged information, calls the corresponding presentation tool 122-N according to the data type of the merged information to render and display the content of the merged information, the presentation tool 122-N transmits the presented content to the projection engine 124, and the projection engine 124 conducts projection according to the presented content to obtain a dot matrix projected image (information in the image coding format); an update generator 126 obtains the projected image from the projection engine 124, compares the projected image with the second response information content, and takes the difference between the two as the second update information content; and after obtaining the second update information content from the update generator 126, the information converter 120 associates the corresponding attributes such as the transmitter, receiver and content category to generate the corresponding second update information, which is sent to the communication module 1-A through the information transmitter II118. The data size transmitted by the scheme is small, and the processing of the user terminal is simple. In this scheme, within the optional range of those skilled in the art, the information converter 120 may also be configured to display the merged information with a corresponding presentation tool according to the type of the target network resource or the data type and content of the first response information or the data type and content of the first update information; the information processing module 1-C receives the first update information through the information receiver II116 and transmits the first update information to the information converter 120; the information converter 120 acquires the data type and content of the first update information, and calls the corresponding presentation tool 122-N to render and display the content of the first update information according to the data type; the presentation tool 122-N transmits the presented content to the projection engine 124, and the projection engine 124 conducts projection according to the presented content to obtain a dot matrix projected image (information in the image coding format) as the second update information content; and after acquiring the projected image from the projection engine 124, the information converter 120 associates the corresponding attributes such as the transmitter, receiver and content category to generate the corresponding second update information, which is sent to the communication module 1-A through the information transmitter II118. In this scheme, because the transmitted data are only the first update information, system processing is simple, the content of the first response information does not need to be kept, and the transmitted data size is small. In this scheme, within the optional range of those skilled in the art, the information converter 120 may also be configured to display the first update information with a corresponding presentation tool according to the type of the target network resource or the data type and content of the first response information.

The communication module 1-A is further configured to send the second update information transmitted by the information processing module 1-C to the user terminal A. In this example, the communication module 1-A receives the second update information through the information receiver I114, and the second update information is encapsulated by the response transmitter 104 (for example, adding information for network transmission such as network communication transmission format and session information) to generate the second update, which is directly sent to the user terminal A.

As a preferred implementation mode of this embodiment, the user may act (including clicking, dragging, sliding or inputting characters) on the second response information through the user terminal, and the operation experience is the same as that when directly accessing network resources.

User Operation Stage:

The communication module 1-A is configured to be capable of acquiring an operation (directly or indirectly transmitted to the communication module by the user terminal) initiated by the user through the user terminal A for the second response information content (the aforementioned projected image), and transmitting the operation to the information processing module 1-C. In this example, the communication module 1-A receives the action (operation) for the second response information content sent by the user terminal A through the request receiver 102, and transmits the action to an action capturer 106. The action capturer 106 captures the aforementioned action, acquires user action information, including action type (such as clicking, dragging, sliding or inputting characters), action position, etc., and transmits the user action information to the information processing module 1 through the information transmitter I112.

The information processing module 1-C is configured to receive the user action information transmitted by the communication module 1-A, simulate and execute the user action on the first response information presented by the corresponding presentation tool, apply the above action to the first response information correspondingly, generate third access request information according to a user action simulation result, and send the third access request information to the communication module 1-A. Specifically, the information receiver II116 in the information processing module 1-C receives the user action information, including action type (such as clicking, dragging, sliding or inputting characters), action position, etc., and transmits the user action information to the information converter 120; and after collecting the user action information, the information converter 120 simulates and executes the user action on the first response information presented by the corresponding presentation tool, generates the third access request information according to the user action simulation result, and sends the third access request information to the communication module 1-A through the information transmitter II118.

For example, assuming that the user accesses a word document stored on a website through a browser of the user terminal A, the word document is presented on a display screen of the user terminal A (actually a projected image of the word document, that is, the aforementioned second response information content), and the user makes a dragging action at a certain position of the second response information content through the user terminal A (the user intends to select some characters in the word document, and the selection of characters in the word document is generally realized by dragging a left mouse button); and after collecting the dragging operation and a position corresponding to the dragging operation, the information converter 120 acts on the first response information correspondingly, which is equivalent to the user dragging the first response information content through the user terminal A, and this operation is equivalent to another piece of access request information for the target network resource on the basis of the first response information, that is, requesting the selection of some characters in the word document, which is called the third access request information here.

The communication module 1-A is further configured to send the third access request information transmitted by the information processing module 1-C to the target network resource server C (directly or indirectly sent to the target network resource server). In this example, the communication module 1-A receives the third access request information through the information receiver I114, and the third access request information is encapsulated by the request transmitter 108 (for example, adding information for network transmission such as network communication transmission format and session information) to generate a third access request, which is directly sent to the target network resource server C.

In response to the user operation stage:

The communication module 1-A is configured to receive a third response returned by the target network resource server C according to the third access request (directly or indirectly transmitted to the communication module by the target network resource server), acquire third response information, and then send the third response information to the information processing module 1-C. In this example, the communication module 1-A receives the third response through the response receiver 110, acquires the third response information, and then transmits the third response information to the information processing module 1-C through the information transmitter I112.

The information processing module 1-C is configured to generate action response information according to the received third response information and send the action response information to the communication module 1-A. Specifically, assuming that the third response information content is a dynamic web page (e.g., a dynamic web page based on JavaScript), the presentation tool 122-N browser (e.g., Chrome, Firefox and Internet Explorer) is called to render and display the third response information, the information in the image coding format is acquired through drawing or projection according to the presented content as action response information content, and the action response information content is associated with the corresponding attributes such as sender, receiver and content category to generate corresponding action response information. In this example, the information processing module 1-C receives the third response information through the information receiver II116 and transmits the third response information to the information converter 120, the information converter 120 acquires the data type and content of the third response information, and calls the corresponding presentation tool 122-N to render and display the third response information according to the data type, the presentation tool 122-N transmits the presented content to the projection engine 124, and the projection engine 124 conducts projection according to the presented content to obtain a dot matrix projected image (i.e., the information in the image coding format) as the action response information content; and after acquiring the projected image from the projection engine 124, the information converter 120 associates the attributes such as the corresponding transmitter, receiver and content category to generate the corresponding action response information as a response/reply to the user action, which is transmitted to the communication module 1-A through the information transmitter II118. In this scheme, because the transmitted data are only the third response information, system processing is simple, the content of the first response information does not need to be reserved, and the transmitted data size is small. Of course, within the optional range of those skilled in the art, the information converter 120 may also be configured to display the third response information with a corresponding presentation tool according to the type of the target network resource or the data type and content of the first response information. For the matching or selection of the presentation tool, the presentation tool may be determined according to the type of the target network resource when the first access request is received, or determined according to the data type and content of the first response information when the first response information is received, or determined according to the data type and content of the third response information when the third response information is received. One may always use the same presentation tool in the process of accessing a certain target network resource, or use different presentation tools according to different access requests or response information in the process of accessing a certain target network resource.

As mentioned above, when generating the action response information according to the received third response information, the following schemes may be adopted: a. the information processing module 1-C receives the third response information through the information receiver II116 and transmits the third response information to the information converter 120; the information converter 120 incorporates the third response information into the first response information to obtain the merged information, calls the corresponding presentation tool 122-N according to the data type to render and display the content of the merged information, the presentation tool 122-N transmits the presented content to the projection engine 124, and the projection engine 124 conducts projection according to the presented content to obtain a dot matrix projected image (information in the image coding format); the update generator 126 obtains the projected image from the projection engine 124, compares the projected image with the second response information content, and takes the difference between the two as the action response information content; after obtaining the action response information content from the update generator 126, the information converter 120 associates the corresponding attributes such as the transmitter, receiver and content category to generate the corresponding action response information, which is sent to the communication module 1-A through the information transmitter II118; the data size transmitted by the scheme is small, and the processing of the user terminal is simple; b. the information processing module 1-C receives the third response information through the information receiver II116 and transmits the third response information to the information converter 120; the information converter 120 incorporates the third response information into the first response information to obtain the merged information, and calls the corresponding presentation tool 122-N according to the data type to render and display the content of the merged information; the presentation tool 122-N transmits the presented content to the projection engine 124, and the projection engine 124 conducts projection according to the presented content to obtain a dot matrix projected image (information in the image coding format) as the action response information content; and after acquiring the projected image from the projection engine 124, the information converter 120 associates the corresponding attributes such as the transmitter, receiver and content category to generate the corresponding action response information, which is sent to the communication module 1-A through the information transmitter II118; and in this scheme, the user terminal A directly obtains the updated image without depending on a result of the second response information. In the above two schemes, within the optional range of those skilled in the art, the information converter 120 may also be configured to display the merged information with a corresponding presentation tool according to the type of the target network resource or the data type and content of the first response information or the data type and content of the third response information.

The communication module 1-A is further configured to send the action response information transmitted by the information processing module 1-C to the user terminal A (directly or indirectly transmitted to the user terminal through the communication module). In this example, the communication module 1-A receives the action response information through the information receiver I114, and the action response information is encapsulated by the response transmitter 104 (for example, adding information for network transmission such as network communication transmission format and session information) to generate a corresponding action response, which is directly sent to the user terminal A as a response/reply to the user action.

In practice, the user initiates an action (such as clicking, dragging, sliding or inputting characters) for the second response information content through the user terminal A; after receiving and capturing the action, the communication module 1-A obtains action information and sends the action information to the information processing module 1-C; the information processing module 1-C receives the user action information transmitted by the communication module 1-A, simulates and executes the user action on the first response information presented by the corresponding presentation tool, applies the above action to the first response information correspondingly, generates the third access request information according to a user action simulation result, and sends the third access request information to the communication module 1-A; the communication module 1-A encapsulates the third access request information transmitted from the information processing module 1-C to generate the third access request and sends the third access request to the target network resource server C; the target network resource server C generates the corresponding third response according to the third access request and transmits the third response to the communication module 1-A; the communication module 1-A receives the third response, acquires the third response information and transmits the third response information to the information processing module 1-C; the information processing module 1-C generates the action response information according to the received third response information and sends the action response information to the communication module 1-A; and the communication module 1-A encapsulates the action response information transmitted by the information processing module 1-C to generate the corresponding action response and sends the action response to the user terminal A, thus completing the whole response to the second response information.

Figure 2:
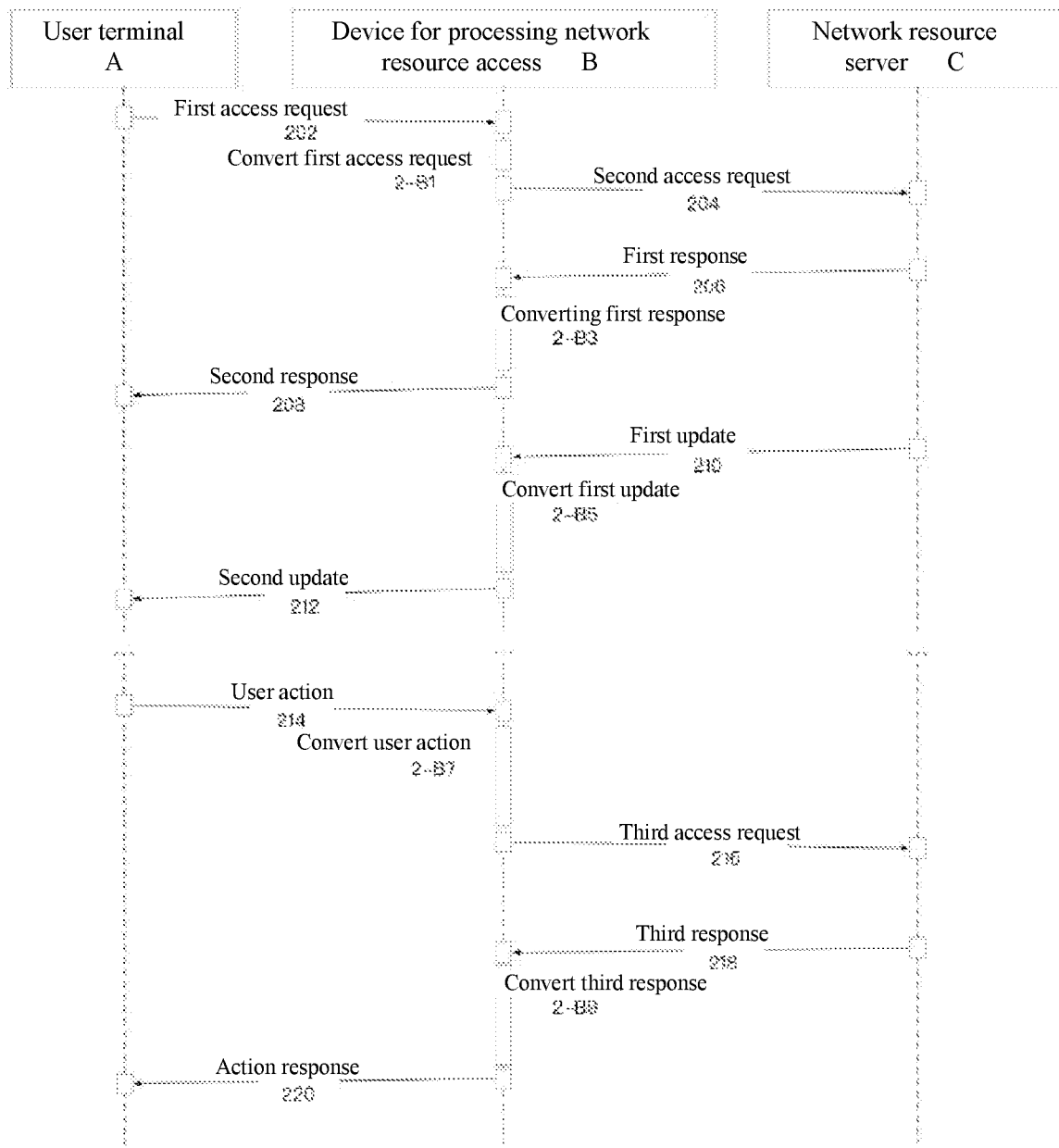
FIG. 2 is a timing chart of a method for processing network resource access according to the invention.

As shown in FIG. 2, a method for processing network resource access in this embodiment comprises:

The first access request 202 for the target network resource is initiated by the user through the user terminal A (or via the network proxy service) and transmitted to the device for processing the network resource access B.

Figure 3:
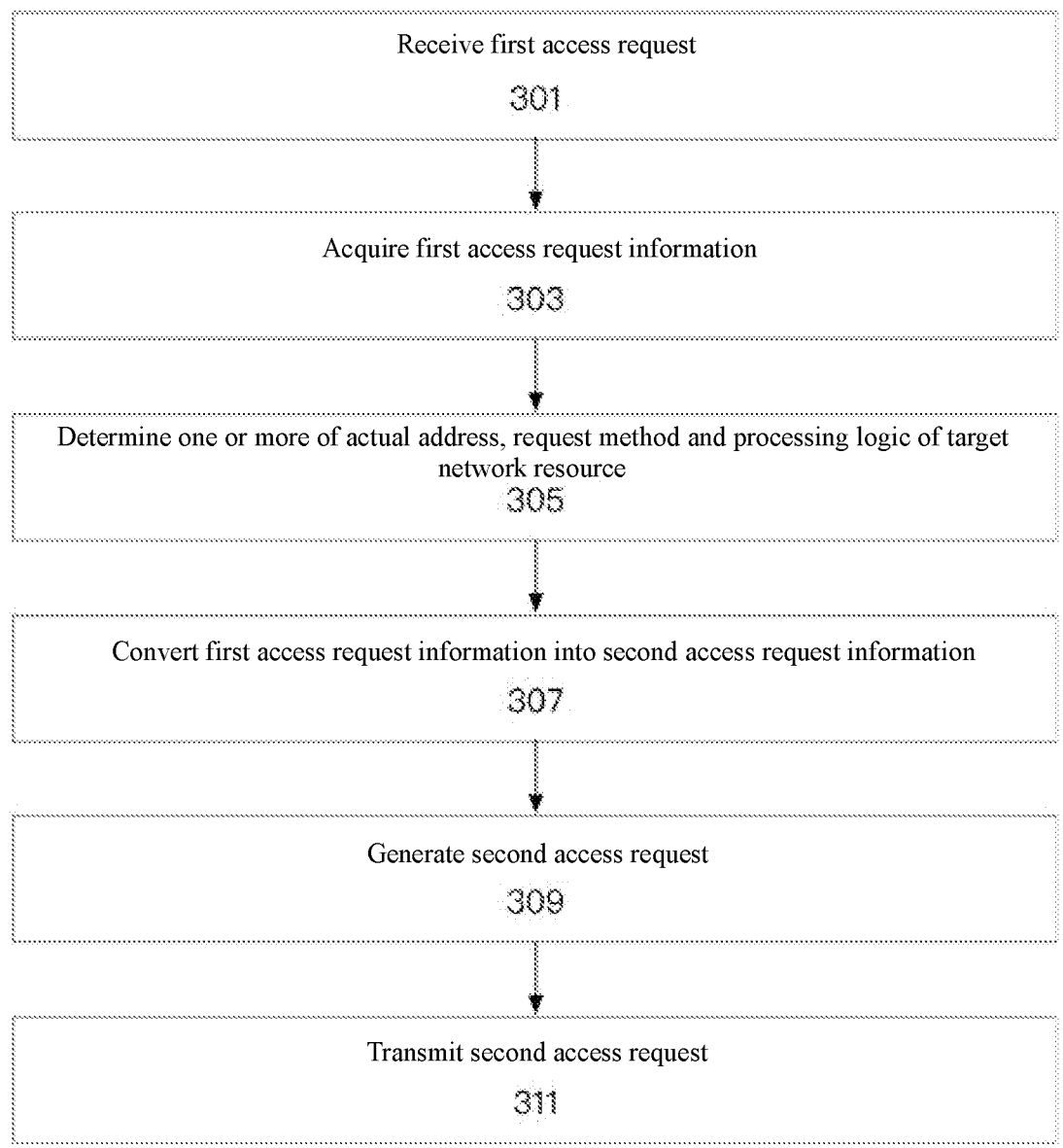
FIG. 3 is a step diagram of converting a first access request according to the invention.

The device for processing the network resource access B converts the first access request according to the preset corresponding relationship (step 2-B1), thereby generating the second access request 204 corresponding to the first access request, and sending the second access request to the target network resource server C. As shown in FIG. 3, converting the first access request (step 2-B1) specifically comprises:

301, receiving the first access request 202. This step is implemented by the request receiver 102 of the communication module 1-A in the aforementioned device for processing the network resource access B.

303, acquiring the first access request information. This step is implemented by the request receiver 102. Then the request information is sent to the aforementioned information processing module 1-C through the information transmitter I112.

305, determining one or more of the actual address, request method and processing logic of the target network resource corresponding to the first access request according to the corresponding relationship (for example, the corresponding relationship between the target network resource and the device for processing network resource access) determined by the system built-in, local administrator or third party configuration. The information processing module 1-C receives the first access request information through the information receiver II116 and transmits the first access request information to the information converter 120. After the information converter 120 obtains the corresponding relationship between the target network resource and the device for processing the network resource access from the resource information 10A, this step is completed.

According to the design and implementation of a system, an access request may be composed of multiple sub-access requests (multiple sub-access requests belonging to the same access request will not request different network resources), for example, the access request of a user terminal requesting access to a resource A may comprise two sub-access requests, a first sub-access request is sending a resource name of the resource A and requesting a one-time access token, a first sub-response is a one-time access token for accessing the resource A within 30 seconds, and a second sub-access request is sending the one-time access token. In this case, after merging multiple associated sub-access requests in the first access request, the information converter 120 determines one or more of the actual address, request method and processing logic of the target network resource corresponding to the first access request according to a corresponding relationship determined by a system built-in, local administrator or third party configuration, and converts the merged request information according to the one or more items determined above to generate the second access request information.

307, performing information conversion according to the one or more items determined above to convert the first access request information into the second access request information. Specifically, the actual address of the target network resource is obtained according to the corresponding relationship between the target network resource and the device for processing the network resource access B. Assuming that the actual address of the target network resource is Addr0, a resource type is Web application, and one needs to log in with a default account to get access to the target network resource, the device for processing the network resource access B calls a browser corresponding to the Web application (e.g., Chrome) to generate second access request information pointing to Addr0 and completing the logic of logging in with the default account. This step is realized by the information converter 120, and transmission to the communication module 1-A is realized through the information transmitter II118.

Alternatively, the following method may be adopted: the information converter 120 performs information conversion according to the one or more items determined above (the conversion method is as described above, which will not be repeated here), and decomposes the converted information to generate the second access request information. The second access request information contains a plurality of pieces of associated sub-access request information. For example, the device for processing the network resource access B requests the access to the resource A, two pieces of associated sub-access request information are obtained through decomposition, first sub-access request information is requesting a one-time access token, a first sub-response is a one-time access token for accessing the resource A within 30 seconds, and second sub-access request information is requesting the access to the content of the resource A. Here, the first sub-access request information and the second sub-access request information are collectively referred to as the second access request information.

309, encapsulating the aforementioned second access request information (for example, adding information for network transmission such as network communication transmission format and session information) to generate the corresponding second access request. The communication module 1-A receives the second access request information through the information receiver I114 and sends the second access request information to the request transmitter 108, and the request transmitter 108 completes the encapsulation process of this step.

311, sending, by the request transmitter 108, the second access request to the target network resource server C.

The target network resource server C generates the corresponding first response 206 according to the second access request 204 and transmits the first response to the device for processing the network resource access B.

Figure 4:
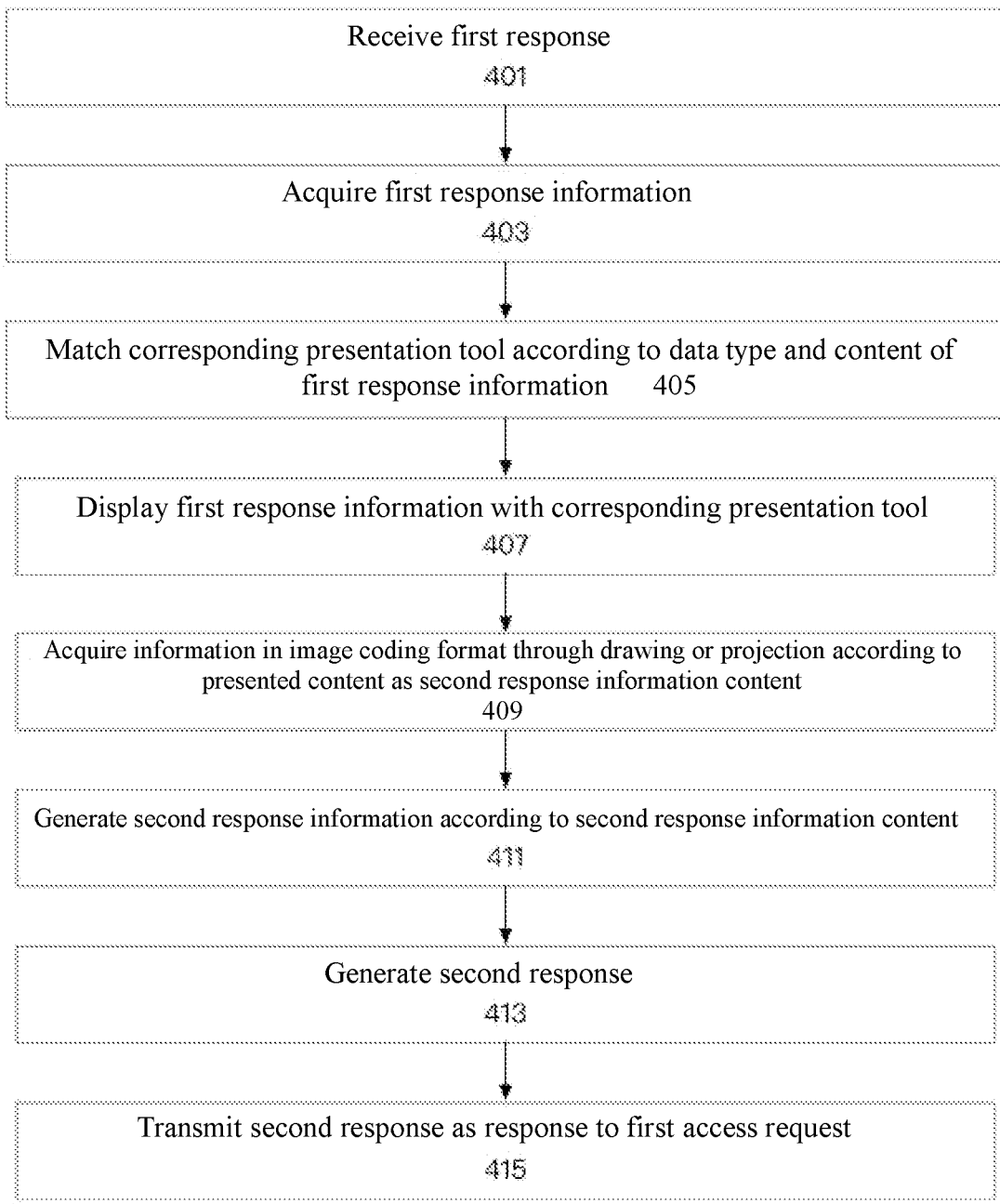
FIG. 4 is a step diagram of converting a first response according to the invention.

The device for processing the network resource access B converts the first response (step 2-B3) to generate the second response 208, which is directly or indirectly sent to the user terminal A. As shown in FIG. 4, converting the first response (step 2-B3) specifically comprises:

401, receiving the first response 206. This step is implemented by the response receiver 110 of the communication module 1-A in the aforementioned device for processing the network resource access B.

403, acquiring the first response information. This step is implemented by the response receiver 110, and then the response information is sent to the aforementioned information processing module 1-C through the information transmitter I112.

405, matching the corresponding presentation tool according to the data type and content of the first response information. Assuming that the first response information content is a dynamic webpage (e.g., a dynamic webpage based on JavaScript), a matching browser (e.g., Chrome, Firefox and Internet Explorer) serves as the presentation tool. The information processing module 1-C receives the first response information through the information receiver II116 and transmits the first response information to the information converter 120. This step is completed by the information converter 120. Of course, within the optional range of those skilled in the art, the corresponding presentation tool may also be matched according to the type of the target network resource.

407, calling the corresponding presentation tool to render and display the first response information. This step is completed by the presentation tool 122-N in the information processing module 1-C.

409, acquiring information in the image coding format through drawing or projection according to the presented content as the second response information content. The exhibition tool 122-N transmits the presented content to the projection engine 124, and the projection engine 124 conducts projection according to the presented content to obtain a dot matrix projected image (i.e., the aforementioned information in the image coding format).

411, generating the corresponding second response information after associating the second response information content with the corresponding attributes such as transmitter, receiver and content category. After the information converter 120 acquires the projected image from the projection engine 124, this step is completed.

413, encapsulating the aforementioned second response information (for example, adding information for network transmission such as network communication transmission format and session information) to generate the corresponding second response. The communication module 1-A receives the second response information sent by the information transmitter I118 through the information receiver I114, and sends the second response information to the response transmitter 104, which completes the encapsulation process of this step.

415, directly or indirectly sending, by the response transmitter 104, the second response to the user terminal A as a response/reply to the first access request.

As mentioned above, the following schemes may also be adopted for converting the first response (Step 2-B3):

In one scheme, 405-A is used instead of 405 and 407-A instead of 407, and other steps remain unchanged.

405-A, merging, by the information converter 120, the plurality of pieces of associated sub-response information in the first response information, and matching the corresponding presentation tool according to the data type and content of the merged information. The information processing module 1-C receives the plurality of pieces of associated sub-response information in the first response information through the information receiver II116 and transmits the sub-response information to the information converter 120. This step is completed by the information converter 120. Of course, within the optional range of those skilled in the art, the corresponding presentation tool may also be matched according to the type of the target network resource or the data type and content of the first response information.

407-A, calling the corresponding presentation tool to render and display the content of the merged information. This step is completed by the presentation tool 122-N in the information processing module 1-C.

Another scheme is suitable for the situation that the data size of the second response information content (projected image) is large. Specifically, 409-B is used to replace the aforementioned 409, 411-B to replace the aforementioned 411, 413-B to replace the aforementioned 413, and other steps remain unchanged.

409-B, acquiring information in the image coding format through drawing or projection according to the presented content, and then decomposing the information (for example, segmenting it into a plurality of images) as the content of the plurality of pieces of associated sub-response information. The presentation tool 122-N transmits the presented content to the projection engine 124, and the projection engine 124 conducts projection according to the presented content to obtain the dot matrix projected image; and after acquiring the projected image from the projection engine 124, the information converter 120 decomposes the projected image to obtain the content of the plurality of pieces of associated sub-response information.

411-B, associating the content of the plurality of pieces of associated sub-response information with the corresponding attributes such as transmitter, receiver and content category to generate the corresponding sub-response information. This step is completed by the information converter 120.

413-*b*, encapsulating the aforementioned sub-response information (for example, add information for network transmission such as network communication transmission format and session information) to generate the corresponding sub-response as the second response (containing a plurality of associated sub-responses). The communication module 1-A receives the sub-response information sent by the information transmitter I118 through the information receiver I114, and sends the sub-response information to the response transmitter 104, which completes the encapsulation process of this step.

The specific implementation of the aforementioned network resource access process is illustrated as follows:

A. The user sends the first access request to the device for processing the network resource access B through the user terminal A, requesting the access to the network resource 1 (resource_0).

B. After receiving the first access request, the device for processing the network resource access B determines that the accessed network resource 1 is a Web application App_0 located at URL_0 according to the corresponding relationship between the network resource 1 and the device for processing the network resource access determined by the system built-in, local administrator or third party configuration.

In the above step A, the first access request may be composed of a plurality of associated child access requests. In the above step B, the device for processing the network resource access may make corresponding replies when receiving a plurality of sub-access requests sent by the user terminal, so as to finally obtain the complete first access request.

C. The device for processing the network resource access B constructs the second access request according to the data type (Web application App_0) and the actual address (URL_0) of the network resource 1, and sends the second access request to the Web application App_0 located at URL_0.

D. After receiving the second access request sent by the device for processing the network resource access B, the network resource 1 (resource_0, Web application App_0 located at URL_0) returns the corresponding first response to the device for processing the network resource access B.

E. After obtaining the first response information, the device for processing the network resource access B uses a browser to render and display the first response information according to the first response information content (e.g., a dynamic webpage based on JavaScript), and acquires the information in the image coding format through drawing or projection according to the presented content as the second response information content.

In the above step C, the second access request may be composed of a plurality of associated sub-access requests. In the above step D, the first response may be composed of a plurality of associated sub-responses. Further, the sub-access requests in step C and the sub-responses in step D occur alternately, specifically, the device for processing the network resource access respectively acquires multiple files of the network resource 1 (resource_0, Web application App_0 located at URL_0), and completes the processing logic such as jump login and return to obtain the complete content of the first response.

F. The device for processing the network resource access associates the second response information content with the corresponding attributes such as transmitter, receiver and content category to generate the corresponding second response information, encapsulates the second response information (for example, adding information for network transmission such as network communication transmission format and session information) to generate the corresponding second response, and sends the second response to the user terminal as a reply/response to the first access request.

In the above step F, the second response sent by the device for processing the network resource access to the user terminal may be composed of a plurality of associated sub-responses, and the sub-request corresponding to the user terminal will be received in the process of sending the plurality of sub-responses, so as to optimize the network transmission efficiency and improve the user experience.

After processing with the method of this embodiment, what the user terminal actually obtains and interacts with is not the actual content of the network resource, but the projection of the content (response information in the image coding format), so that security is improved without affecting the actual use experience of users.

I. The content projection is an image generated in real time and does not contain any actual information of the network resource (such as location, version information and composition), so attackers cannot obtain the actual information of the network resource for attack and penetration.

II. Because what the user terminal obtains is an image, it is hard for attackers to grasp and analyze the information of the network resource with automated tools, thus being unable to launch an effective attack:

(1) what attackers actually visit is a projected image, and automated tools usually do not grab static images;

(2) even if attackers grab the projected image of the network resource, it is hard for them to directly analyze the actual content of the network resource due to the limitation of picture recognition technologies; and (3) because the current content of the network resource cannot be accurately identified, it is hard for automated tools to perform simulation, thus limiting further actions of attackers.

III. In the case that there are vulnerabilities in the network resource, it will be difficult for hackers to identify and find these vulnerabilities because the user terminal can only perform interaction based on the projected image. Moreover, even if it is found that there are vulnerabilities, it is difficult to use these vulnerabilities for attack effectively through interaction with the projected image.

IV. The projected image of the network resource only carries limited resource data, which may effectively prevent the data in the network resource from being abused or leaked.

As a preferred implementation mode of this embodiment, the response information of some network resources is essentially dynamic, such as video. In order to ensure that the user obtains the experience the same as direct access, this implementation mode further comprises:

the target network resource server C sends the first update 210 for the first response to the device for processing the network resource access B (directly or indirectly sends the first update to the device for processing the network resource access).

Figure 5:
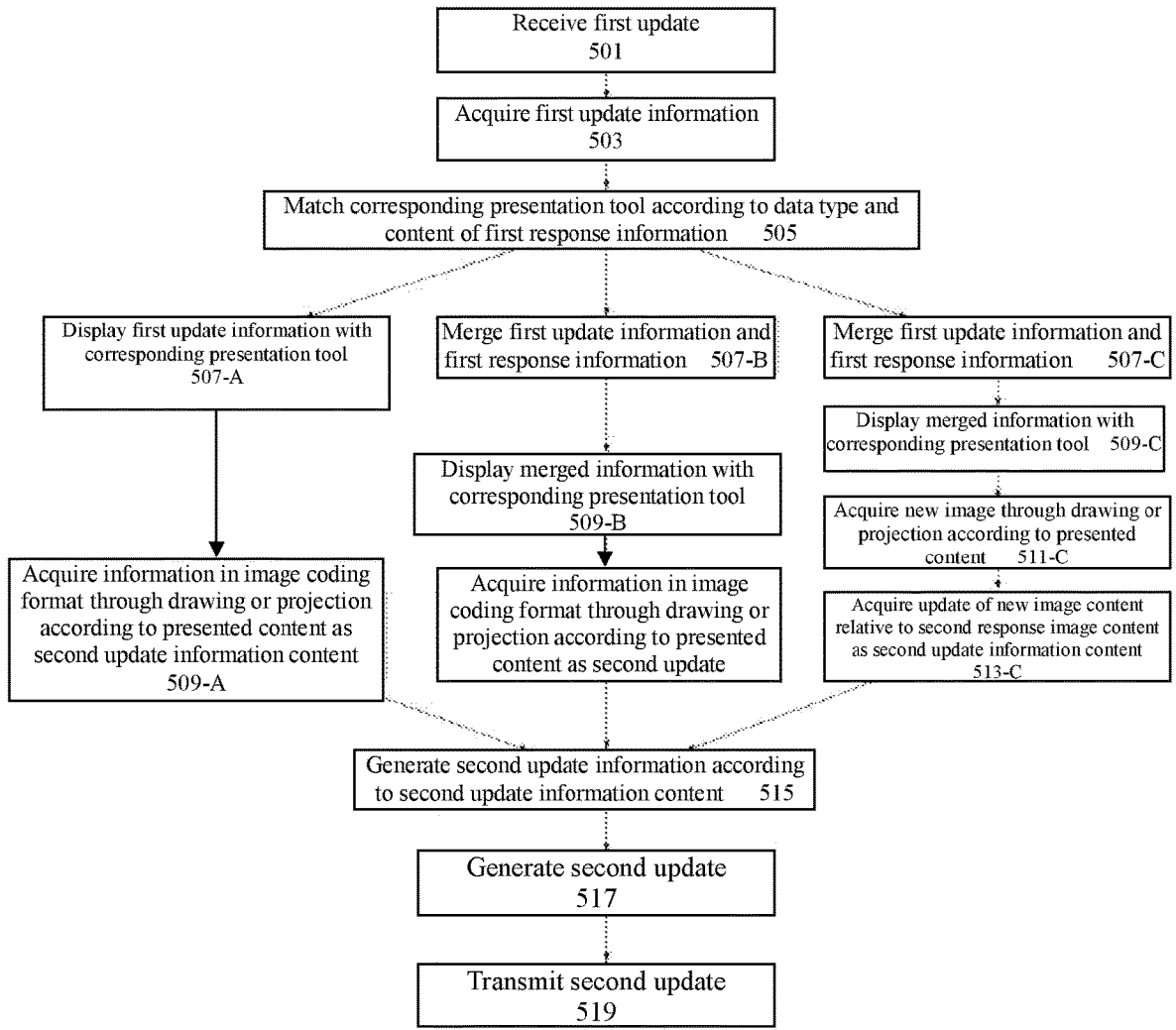
FIG. 5 is a step diagram of converting a first update according to the invention.

The device for processing the network resource access B converts the first update (step 2-B5) to generate the corresponding second update 212 for the second response information content, and directly or indirectly sends the second update to the user terminal A. As shown in FIG. 5, the following three schemes may be adopted to convert the first update (step 2-B5):

Scheme I:

501, receiving the first update 210. This step is implemented by the response receiver 110 of the communication module 1-A in the aforementioned device for processing the network resource access B.

503, acquiring the first update information. This step is implemented by the response receiver 110. Then the update information is sent to the aforementioned information processing module 1-C through the information transmitter I112.

505, matching the corresponding presentation tool according to the data type and content of the first update information. Assuming that the first response information content is a dynamic webpage (e.g., a dynamic webpage based on JavaScript), a matching browser (e.g., Chrome, Firefox and Internet Explorer) serves as the presentation tool. The information processing module 1-C receives the first update information through the information receiver I116 and transmits the first update information to the information converter 120. This step is completed by the information converter 120. Within the optional range of those skilled in the art, the corresponding presentation tool may also be matched according to the type of the target network resource or the data type and content of the first response information.

507-A, calling the corresponding presentation tool to render and display the first update information. This step is completed by the presentation tool 122-N in the information processing module 1-C.

509-A, acquiring information in the image coding format through drawing or projection according to the presented content as the second update information content. The exhibition tool 122-N transmits the presented content to the projection engine 124, and the projection engine 124 conducts projection according to the presented content to obtain a dot matrix projected image as the second update information content.

515, generating the corresponding second update information after associating the second update information content with the corresponding attributes such as transmitter, receiver and content category. After the information converter 120 acquires the projected image from the projection engine 124, this step is completed.

517, encapsulating the aforementioned second update information (for example, adding information for network transmission such as network communication transmission format and session information) to generate the corresponding second update. The communication module 1-A receives the second update information sent by the information transmitter I118 through the information receiver I114, and sends the second update information to the response transmitter 104, which completes the encapsulation process of this step.

519, sending, by the response transmitter 104, the second update directly or indirectly to the user terminal A.

In this scheme, because the transmitted data are only the first update, system processing is simple, there is no need to keep the first response information and process the update, and the transmitted data size is small.

Scheme II:

501, receiving the first update 210. This step is implemented by the response receiver 110 of the communication module 1-A in the aforementioned device for processing the network resource access B.

503, acquiring the first update information. This step is implemented by the response receiver 110. Then the update information is sent to the aforementioned information processing module 1-C through the information transmitter I112.

505, matching the corresponding presentation tool according to the data type and content of the first response information. Assuming that the first update information content is a dynamic webpage (e.g., a dynamic webpage based on JavaScript), a matching browser (e.g., Chrome, Firefox and Internet Explorer) serves as the presentation tool. The information processing module 1-C receives the first update information through the information receiver I116 and transmits the first update information to the information converter 120. This step is completed by the information converter 120.

507-b, incorporating the first update information into the first response information to obtain the merged information. This step is completed by the information converter 120.

509-B, calling the corresponding presentation tool to render and display the merged information. This step is completed by the presentation tool 122-N in the information processing module 1-C.

511-B, acquiring information in the image coding format through drawing or projection according to the presented content as the second update information content. The exhibition tool 122-N transmits the presented content to the projection engine 124, and the projection engine 124 conducts projection according to the presented content to obtain a dot matrix projected image as the second update information content.

515, associating the second update information content with the corresponding attributes such as transmitter, receiver and content category to generate the corresponding second update information. The information converter 120 acquires the projected image from the projection engine 124 to complete this step.

517, encapsulating the aforementioned second update information (for example, add information for network transmission such as network communication transmission format and session information) to generate the corresponding second update. The communication module 1-A receives the second update information sent by the information transmitter II118 through the information receiver I114, and sends the second update information to the response transmitter 104, which completes the encapsulation process of this step.

519, sending, by the response transmitter 104, the second update directly or indirectly to the user terminal A.

In this scheme, 505 may also be deleted, and the following step may be added between 507-B and 509-B: matching the corresponding presentation tool according to the data type and content of the merged information. Within the optional range of those skilled in the art, the corresponding presentation tool may also be matched according to the type of the target network resource or the data type and content of the first response information or the data type and content of the first update information.

In this scheme, the user terminal directly obtains the updated image without depending on a result of the second response information.

Scheme III:

501, receiving the first update 210. This step is implemented by the response receiver 110 of the communication module 1-A in the aforementioned device for processing the network resource access B.

503, acquiring the first update information. This step is implemented by the response receiver 110. Then the update information is sent to the aforementioned information processing module 1-C through the information transmitter I112.

505, matching the corresponding presentation tool according to the data type and content of the first response information. Assuming that the first update information content is a dynamic webpage (e.g., a dynamic webpage based on JavaScript), a matching browser (e.g., Chrome, Firefox and Internet Explorer) serves as the presentation tool. The information processing module 1-C receives the first update information through the information receiver I116 and transmits the first update information to the information converter 120. This step is completed by the information converter 120.

507-C, incorporating the first update information into the first response information to obtain the merged information. This step is completed by the information converter 120.

509-C, calling the corresponding presentation tool to render and display the merged information. This step is completed by the presentation tool 122-N in the information processing module 1-C.

511-C, acquiring information in the image coding format through drawing or projection according to the presented content. The exhibition tool 122-N transmits the presented content to the projection engine 124, and the projection engine 124 conducts projection according to the presented content to obtain a dot matrix projected image.

513-C, comparing the obtained projected image with the second response information content, and taking the difference between the two as the second update information content. After obtaining the projected image from the projection engine 124, the update generator 126 compares the projected image with the second response information content, and takes the difference between them as the second update information content for the second response information.

515, generating the corresponding second update information after associating the second update information content with the corresponding attributes such as transmitter, receiver and content category. After the information converter 120 acquires the second update information content from the update generator 126, this step is completed.

517, encapsulating the aforementioned second update information (for example, adding information for network transmission such as network communication transmission format and session information) to generate the corresponding second update. The communication module 1-A receives the second update information sent by the information transmitter I118 through the information receiver I114, and sends the second update information to the response transmitter 104, which completes the encapsulation process of this step.

519, sending, by the response transmitter 104, the second update directly or indirectly to the user terminal A.

In this scheme, 505 may also be deleted, and the following step may be added between 507-C and 509-C: matching the corresponding presentation tool according to the data type and content of the merged information. Within the optional range of those skilled in the art, the corresponding presentation tool may also be matched according to the type of the target network resource or the data type and content of the first response information or the data type and content of the first update information.

The transmitted data size in this scheme is small, and the processing of the user terminal is simple.

As a preferred implementation mode of this embodiment, the user may act (including clicking, dragging, sliding or inputting characters) on the second response information through the user terminal, and the operation experience is the same as that when directly accessing network resources. Therefore, this implementation mode also comprises the following content on the basis of the aforementioned scheme.

The user acts on the second response information through the user terminal A.

Figure 6:
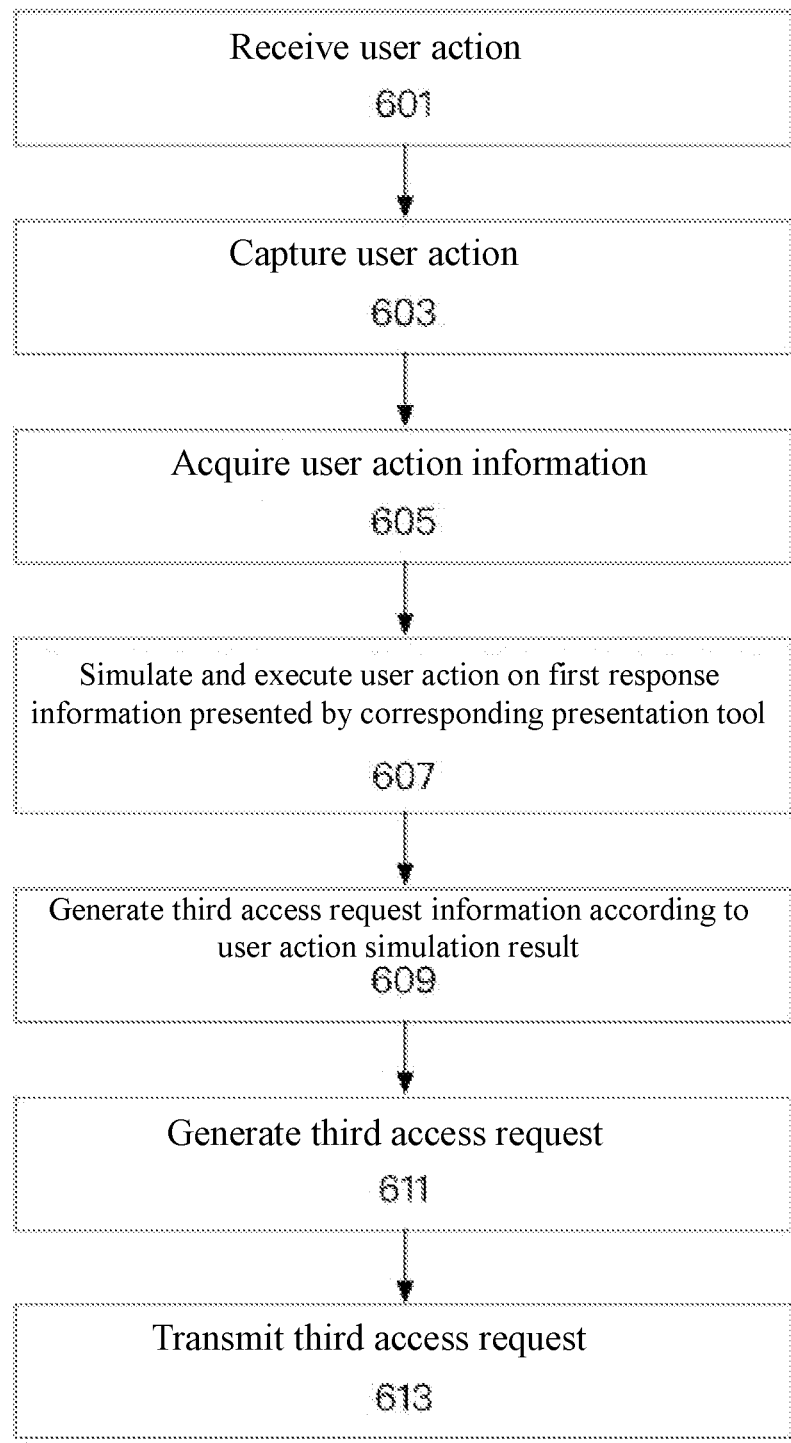
FIG. 6 is a step diagram of converting a user action according to the invention.

After obtaining the user action 214 of the user for the second response information, the device for processing the network resource access B converts the user action (step 2-B7) to generate the third access request 216, and transmits the third access request to the target network resource server C. As shown in FIG. 6, converting the user action (step 2-B7) specifically comprises:

601, receiving the user action. This step is implemented by the request receiver 102 of the communication module 1-A in the aforementioned device for processing the network resource access B.

603, capturing the user action. This step is implemented by the action capturer 106.

605, acquiring the user action information, comprising an action type (such as clicking and dragging) and an action position. This step is implemented by the action capturer 106, and then the updated information is sent to the aforementioned information processing module 1-C through the information transmitter I112.

607, simulating and executing the user action on the first response information presented by the corresponding presentation tool, and applying the action to the first response information correspondingly. The information processing module 1-C receives the user action information through the information receiver II116 and transmits the user action information to the information converter 120. The information converter 120 simulates and executes the user action on the first response information presented by the presentation tool 122-N.

609, generating the third access request information according to the user action simulation result. This step is implemented by the information converter 120.

611, encapsulating the aforementioned third access request information (for example, adding information for network transmission such as network communication transmission format and session information) to generate the corresponding third access request. The communication module 1-A receives the third access request information through the information receiver I114 and sends the third access request information to the request transmitter 108, and the request transmitter 108 completes the encapsulation process of this step.

613, sending, by the request transmitter 108, the third access request to the target network resource server C.

The target network resource server C generates the corresponding third response 218 according to the third access request 216 and transmits the third response to the device for processing the network resource access B.

Figure 7:
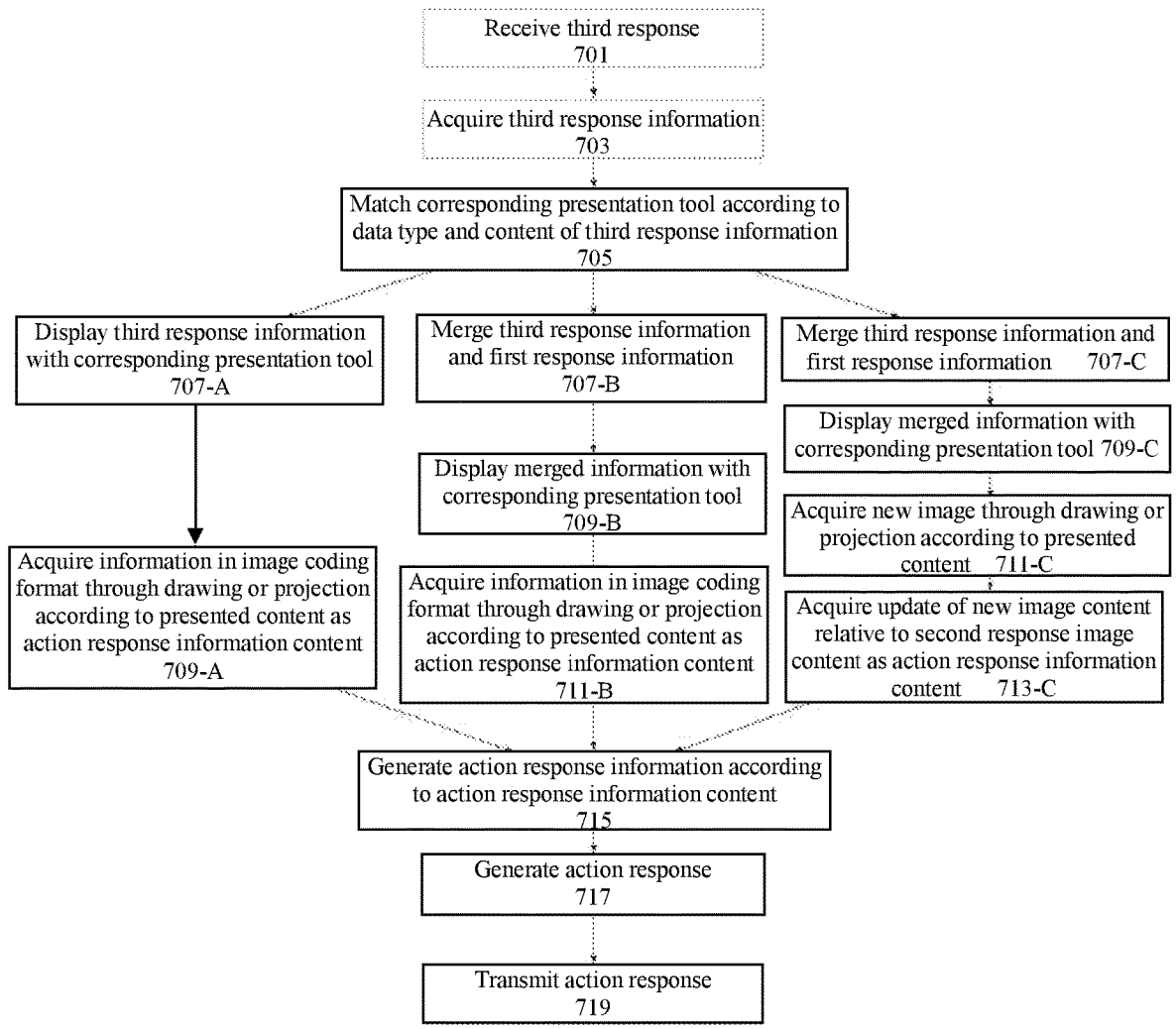
FIG. 7 is a step diagram of converting a third response according to the invention.

The device for processing the network resource access B converts the third response (step 2-B3) to generate the action response 220 as a response to the user action, which is directly or indirectly sent to the user terminal A. As shown in FIG. 7, the following three schemes may be adopted to convert the third response (step 2-B3):

Scheme I:

701, receiving the third response 218. This step is implemented by the response receiver 110 of the communication module 1-A in the aforementioned device for processing the network resource access B.

703, acquiring the third response information. This step is implemented by the response receiver 110. Then the response information is sent to the aforementioned information processing module 1-C through the information transmitter I112.

705, matching the corresponding presentation tool according to the data type and content of the third response information. Assuming that the third response information content is a dynamic webpage (e.g., a dynamic webpage based on JavaScript), a matching browser (e.g., Chrome, Firefox and Internet Explorer) serves as the presentation tool. The information processing module 1-C receives the third response information through the information receiver II116 and transmits the third response information to the information converter 120. This step is completed by the information converter 120. Within the optional range of those skilled in the art, the corresponding presentation tool may also be matched according to the type of the target network resource or the data type and content of the first response information.

707-A, calling the corresponding presentation tool to render and display the third response information. This step is completed by the presentation tool 122-N in the information processing module 1-C.

709-A, acquiring information in the image coding format through drawing or projection according to the presented content as the action response information content. The exhibition tool 122-N transmits the presented content to the projection engine 124, and the projection engine 124 conducts projection according to the presented content to obtain a dot matrix projected image as the action response information content.

715, generating the corresponding action response information after associating the action response information content with the corresponding attributes such as transmitter, receiver and content category. After the information converter 120 acquires the projected image from the projection engine 124, this step is completed.

717, encapsulating the aforementioned action response information (for example, adding information for network transmission such as network communication transmission format and session information) to generate the corresponding action response. The communication module 1-A receives the action response information sent by the information transmitter I118 through the information receiver I114, and sends the action response information to the response transmitter 104, which completes the encapsulation process of this step.

719, sending, by the response transmitter 104, the action response directly or indirectly to the user terminal A.

In this scheme, system processing is simple, there is no need to keep the first response information and process the update, and the transmitted data size is small.

Scheme II:

701, receiving the third response 218. This step is implemented by the response receiver 110 of the communication module 1-A in the aforementioned device for processing the network resource access B.

703, acquiring the third response information. This step is implemented by the response receiver 110. Then the response information is sent to the aforementioned information processing module 1-C through the information transmitter I112.

705, matching the corresponding presentation tool according to the data type and content of the third response information. Assuming that the third response information content is a dynamic webpage (e.g., a dynamic webpage based on JavaScript), a matching browser (e.g., Chrome, Firefox and Internet Explorer) serves as the presentation tool. The information processing module 1-C receives the third response information through the information receiver I116 and transmits the third response information to the information converter 120. This step is completed by the information converter 120.

707-B, incorporating the third response information into the first response information to obtain the merged information. This step is completed by the information converter 120.

709-B, calling the corresponding presentation tool to render and display the merged information. This step is completed by the presentation tool 122-N in the information processing module 1-C.

711-B, acquiring information in the image coding format through drawing or projection according to the presented content as the action response information content. The exhibition tool 122-N transmits the presented content to the projection engine 124, and the projection engine 124 conducts projection according to the presented content to obtain a dot matrix projected image as the action response information content.

715, associating the action response information content with the corresponding attributes such as transmitter, receiver and content category to generate the corresponding action response information. The information converter 120 acquires the projected image from the projection engine 124 to complete this step.

717, encapsulating the aforementioned action response information (for example, add information for network transmission such as network communication transmission format and session information) to generate the corresponding action response. The communication module 1-A receives the action response information sent by the information transmitter I118 through the information receiver I114, and sends the action response information to the response transmitter 104, which completes the encapsulation process of this step.

719, directly or indirectly sending, by the response transmitter 104, the action response to the user terminal A as a response/reply to the user action.

In this scheme, 705 may also be deleted, and the following step may be added between 707-B and 709-B: matching the corresponding presentation tool according to the data type and content of the merged information. Within the optional range of those skilled in the art, the corresponding presentation tool may also be matched according to the type of the target network resource or the data type and content of the first response information or the data type and content of the third response information.

In this scheme, the user terminal directly obtains the updated image without depending on a result of the second response information.

Scheme III:

701, receiving the third response 218. This step is implemented by the response receiver 110 of the communication module 1-A in the aforementioned device for processing the network resource access B.

703, acquiring the third response information. This step is implemented by the response receiver 110. Then the response information is sent to the aforementioned information processing module 1-C through the information transmitter I112.

705, matching the corresponding presentation tool according to the data type and content of the third response information. Assuming that the third response information content is a dynamic webpage (e.g., a dynamic webpage based on JavaScript), a matching browser (e.g., Chrome, Firefox and Internet Explorer) serves as the presentation tool. The information processing module 1-C receives the third response information through the information receiver II116 and transmits the third response information to the information converter 120. This step is completed by the information converter 120.

707-C, incorporating the third response information into the first response information to obtain the merged information. This step is completed by the information converter 120.

709-C, calling the corresponding presentation tool to render and display the merged information. This step is completed by the presentation tool 122-N in the information processing module 1-C.

711-C, acquiring information in the image coding format through drawing or projection according to the presented content. The exhibition tool 122-N transmits the presented content to the projection engine 124, and the projection engine 124 conducts projection according to the presented content to obtain a dot matrix projected image.

713-C, comparing the obtained projected image with the second response information content, and taking the difference between the two as the action response information content. After obtaining the projected image from the projection engine 124, the update generator 126 compares the projected image with the second response information content, and takes the difference between them as the action response information content.

715, generating the corresponding action response information after associating the action response information content with the corresponding attributes such as transmitter, receiver and content category. After the information converter 120 acquires the action response information content from the update generator 126, this step is completed.

717, encapsulating the aforementioned action response information (for example, adding information for network transmission such as network communication transmission format and session information) to generate the corresponding action response. The communication module 1-A receives the action response information sent by the information transmitter I118 through the information receiver I114, and sends the action response information to the response transmitter 104, which completes the encapsulation process of this step.

719, sending, by the response transmitter 104, the action response directly or indirectly to the user terminal A.

In this scheme, 705 may also be deleted, and the following step may be added between 707-C and 709-C: matching the corresponding presentation tool according to the data type and content of the merged information. Within the optional range of those skilled in the art, the corresponding presentation tool may also be matched according to the type of the target network resource or the data type and content of the first response information or the data type and content of the third response information.

The transmitted data size in this scheme is small, and the processing of the user terminal is simple.

Assuming that the user accesses a word document stored on a website through a browser of the user terminal, the word document is presented on a display screen of the user terminal (actually a projected image of the word document, that is, the aforementioned second response information content), and the user makes a dragging action at a certain position of the second response information content through the user terminal (the user intends to select some characters in the word document, and the selection of characters in the word document is generally realized by dragging a left mouse button); and after collecting the dragging operation and a position corresponding to the dragging operation, the device for processing the network resource access B acts on the first response information correspondingly, which is equivalent to the user dragging the first response information through the user terminal, and this operation is equivalent to another access request for the target network resource on the basis of the first response information, that is, requesting the selection of some characters in the word document, which is called the third access request here. In this case, the target network resource will generate the third response according to the third access request (for example, the background color of the selected characters in the document changes). After obtaining the third response information, the device for processing the network resource access B incorporates the third response information into the first response information to obtain the merged information, calls the corresponding presentation tool to render and display the merged information, and acquires the information in the image coding format through drawing or projection according to the presented content as the action response information content. That is, the user is presented with the action response information content in the image coding format, including the content of the word document and the characters with changed background color in the document.

The invention also provides a device for processing network resource access, comprising a memory and a processor which communicate with each other, and a computer program stored in the memory and capable of running on the processor, and the processor executes the aforementioned method for processing the network resource access when running the computer program.

Figure 8:
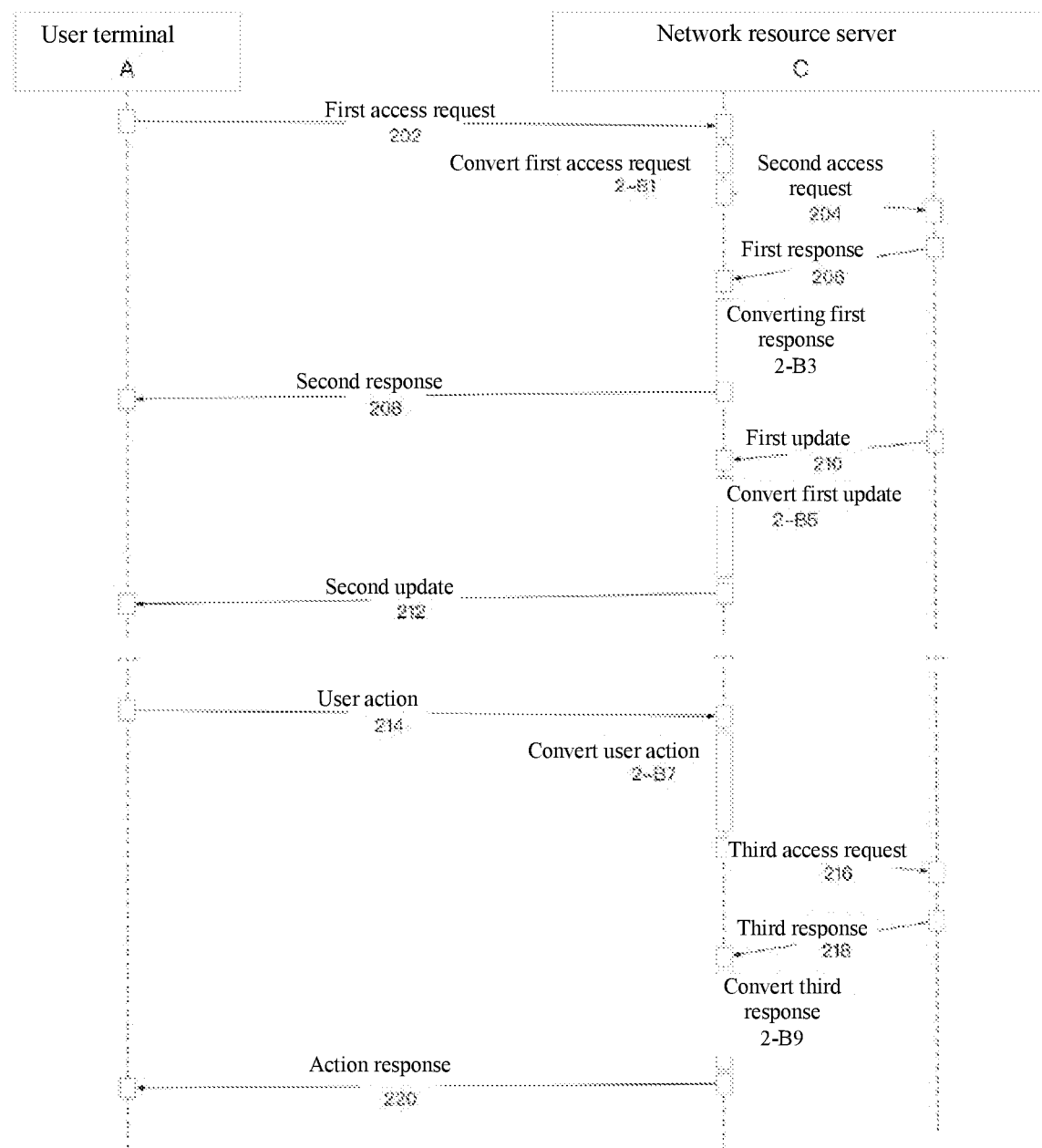
FIG. 8 is a timing chart of another method for processing network resource access according to the invention.

As shown in FIG. 8, another method for processing network resource access in this embodiment comprises:

The first access request 202 for the target network resource is initiated by the user through the user terminal A (or via the network proxy service) and transmitted to the target network resource server C.

The target network resource server C converts the first access request according to the preset corresponding relationship (step 2-B1) to generate the second access request 204 corresponding to the first access request, the specific implementation mode of which is similar to the aforementioned step of converting the first access request (shown in FIG. 3), with the difference that in this embodiment, the executing subject of converting the first access request is the target network resource server C.

The target network resource server C generates the corresponding first response 206 according to the second access request 204, converts the first response (step 2-B3) to generate the second response 208, and directly or indirectly sends the second response to the user terminal A. The specific implementation mode of step 2-B3 is similar to the aforementioned step of converting the first response (as shown in FIG. 4), with the difference that in this embodiment, the executing subject of converting the first response is the target network resource server C.

As a preferred implementation mode of this embodiment, the response information of some network resources is essentially dynamic, such as video. In order to ensure that the user obtains the experience the same as direct access, this implementation mode further comprises:

The target network resource server C generates the first update 210 for the first response, converts the first update (step 2-B5) to generate the corresponding second update 212 for the second response information content, and sends the second update directly or indirectly to the user terminal A. The specific implementation mode of step 2-B5 is similar to the aforementioned step of converting the first update (as shown in FIG. 5), with the difference that in this embodiment, the executing subject of converting the first update is the target network resource server C.

As a preferred implementation mode of this embodiment, the user may act (including clicking, dragging, sliding or inputting characters) on the second response information through the user terminal, and the operation experience is the same as that when directly accessing network resources.

Therefore, this implementation mode also comprises the following content on the basis of the aforementioned scheme.

The user acts on the second response information through the user terminal A.

After obtaining the user action 214 of the user for the second response information, the target network resource server C converts the user action (step 2-B7) to generate the third access request 216. The specific implementation mode of step 2-B7 is similar to the aforementioned step of converting the user action (as shown in FIG. 6), with the difference that in this embodiment, the executing subject of converting the user action is the target network resource server C.

The target network resource server C generates the corresponding third response 218 according to the third access request 216, and converts the third response (step 2-B9) to generate the action response 220 as a response/reply to the user action, which is directly or indirectly sent to the user terminal A. The specific implementation mode of step 2-B9 is similar to the aforementioned step of converting the third response (as shown in FIG. 7), with the difference that in this embodiment, the executing subject of converting the third response is the target network resource server C.

Figure 9:
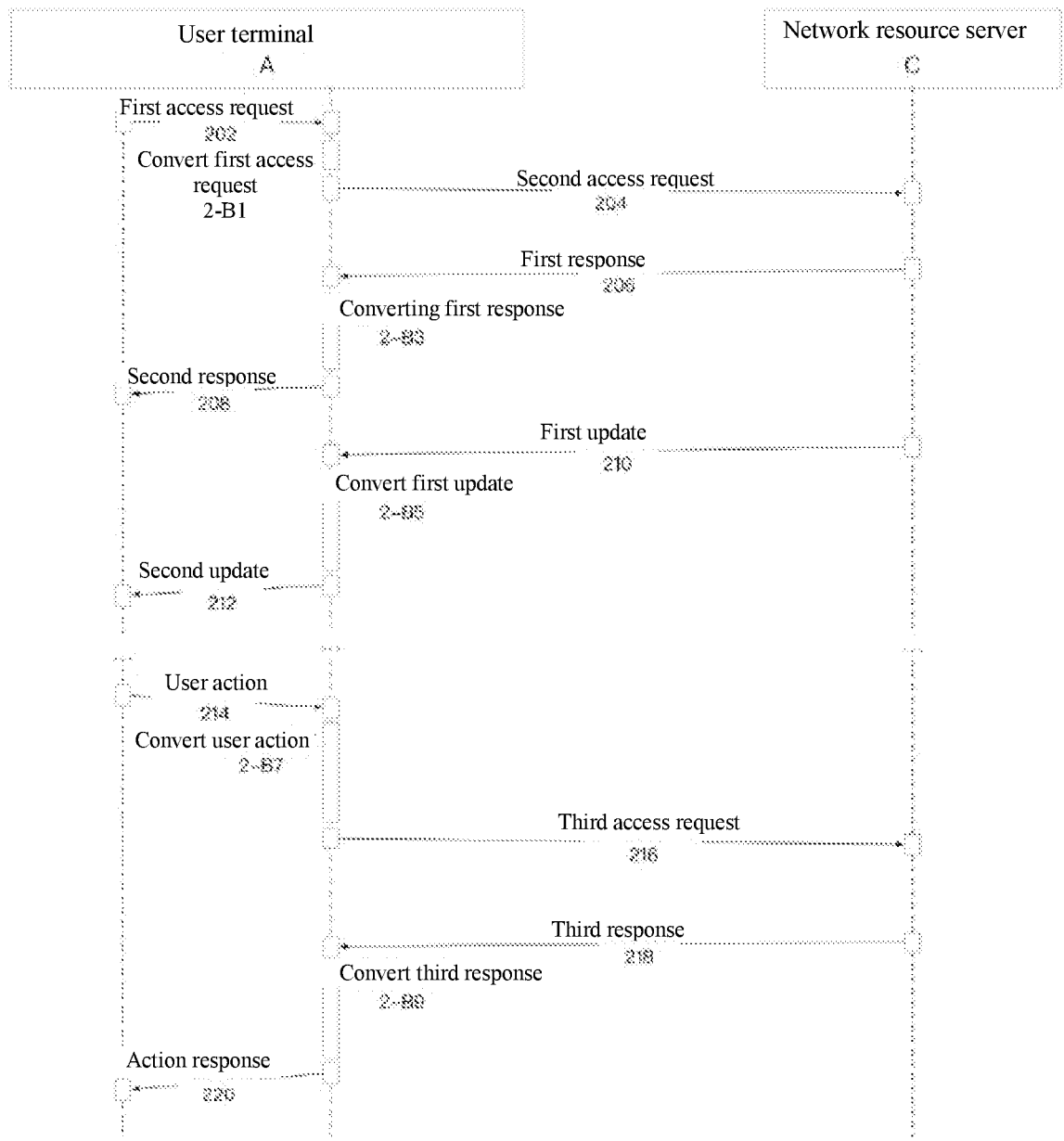
FIG. 9 is a timing chart of another method for processing network resource access according to the invention.

As shown in FIG. 9, another method for processing network resource access in this embodiment comprises:

The first access request 202 for the target network resource is initiated by the user through the user terminal A (or via the network proxy service), and the first access request is converted according to the preset corresponding relationship (step 2-B1) to generate the second access request 204 corresponding to the first access request, which is transmitted to the target network resource server C. The specific implementation mode of step 2-B1 is similar to the aforementioned step of converting the first access request (as shown in FIG. 3), with the difference that in this embodiment, the executing subject of converting the first access request is the user terminal A.

The target network resource server C generates the corresponding first response 206 according to the second access request 204 and directly or indirectly transmits the first response to the user terminal A.

The user terminal A converts the first response (step 2-B3) to generate the second response 208 as a response/reply to the first access request. The specific implementation mode of step 2-B3 is similar to the aforementioned step of converting the first response (as shown in FIG. 4), with the difference that in this embodiment, the executing subject of converting the first response is the user terminal A.

As a preferred implementation mode of this embodiment, the response information of some network resources is essentially dynamic, such as video. In order to ensure that the user obtains the experience the same as direct access, this implementation mode further comprises:

The target network resource server C sends the first update 210 for the first response to the user terminal A (directly or indirectly sends the first update to the user terminal).

The user terminal A converts the first update (step 2-B5) to generate the corresponding second update 212 for the second response information content. The specific implementation mode of step 2-B5 is similar to the aforementioned step of converting the first update (as shown in FIG. 5), with the difference that in this embodiment, the executing subject of converting the first update is the user terminal A.

As a preferred implementation mode of this embodiment, the user may act (including clicking, dragging, sliding or inputting characters) on the second response information through the user terminal, and the operation experience is the same as that when directly accessing network resources. Therefore, this implementation mode also comprises the following content on the basis of the aforementioned scheme.

The user acts on the second response information through the user terminal A.

After obtaining the user action 214 of the user for the second response information, the user terminal A converts the user action (Step 2-B7) to generate the third access request 216, and sends the third access request to the target network resource server C. The specific implementation mode of step 2-B7 is similar to the aforementioned step of converting the user action (as shown in FIG. 6), with the difference that in this embodiment, the executing subject of converting the user action is the user terminal A.

The target network resource server C generates the corresponding third response 218 according to the third access request 216 and transmits the third response to the user terminal A.

The user terminal A converts the third response (step 2-B9) to generate the action response 220 as a response/reply to the user action. The specific implementation mode of step 2-B9 is similar to the aforementioned step of converting the third response (as shown in FIG. 7), with the difference that in this embodiment, the executing subject of converting the third response is the user terminal A.

What is claimed is:

1. A method for processing network resource access, comprising:
    receiving a first access request for a target network resource, generating a second access request corresponding to the first access request according to a preset corresponding relationship, and transmitting to a target network resource server;
    receiving a first response returned by the target network resource server according to the second access request, and converting the first response to generate information in an image coding format as second response information content; and
    generating a second response according to the second response information content as a response to the first access request, and transmitting to a user terminal;
    acquiring a user action for the second response information initiated by a user through a user terminal;
    converting the user action to generate a third access request, and transmitting to the target network resource server;
    converting a third response returned by the target network resource server according to the third access request to generate an action response; and
    transmitting the action response to the user terminal as a response to the user action;
    wherein converting the first response to generate information in an image coding format specifically comprises: acquiring first response information, presenting the first response information with a corresponding presentation tool according to a type of the target network resource or a data type and content of the first response information, and generating the information in the image coding format according to presented content; and
    wherein converting the user action to generate a third access request specifically comprises:
    capturing the user action and acquiring user action information;
    simulating and executing the user action on the first response information presented by the corresponding presentation tool according to the user action information;
    generating third access request information according to a user action simulation result; and
    generating the third access request according to the third access request information.

2. The method for processing the network resource access according to claim 1, wherein generating a second access request corresponding to the first access request according to a preset corresponding relationship specifically comprises:
    acquiring first access request information; determining one or more of an actual address, request method and processing logic of the target network resource corresponding to the first access request according to a corresponding relationship determined by a system built-in, local administrator or third party configuration, and converting the first access request information according to the one or more items determined above to generate second access request information; and generating the second access request according to the second access request information;
    or, after merging a plurality of associated sub-access requests in the first access request, acquiring merged request information; determining one or more of an actual address, request method and processing logic of the target network resource corresponding to the first access request according to a corresponding relationship determined by a system built-in, local administrator or third party configuration, and converting the merged request information according to the one or more items determined above to generate second access request information; and generating the second access request according to the second access request information;
    or, acquiring first access request information; determining one or more of an actual address, request method and processing logic of the target network resource corresponding to the first access request according to a corresponding relationship determined by a system built-in, local administrator or third party configuration, converting the first access request information according to the one or more items determined above, and decomposing the converted information to obtain second access request information containing a plurality of pieces of associated sub-access request information; and generating the second access request according to the second access request information.

3. The method for processing the network resource access according to claim 1, wherein the user action information comprises an action type and an action position.

4. The method for processing the network resource access according to claim 1, wherein converting a third response returned by the target network resource server according to the third access request to generate an action response specifically comprises:
    receiving the third response and acquiring third response information; presenting the third response information with a corresponding presentation tool according to the type of the target network resource or the data type and content of the first response information or a data type and content of the third response information, and generating information in an image coding format according to the presented content as action response information content; and generating the action response according to the action response information content;

or, receiving the third response and acquiring third response information; merging the third response information and the first response information, presenting the merged information with a corresponding presentation tool according to the type of the target network resource or the data type and content of the first response information or a data type and content of the third response information or a data type and content of the merged information, and generating information in an image coding format according to the presented content as action response information content; and generating the action response according to the action response information content;

or, receiving the third response and acquiring third response information; merging the third response information and the first response information, presenting the merged information with a corresponding presentation tool according to the type of the target network resource or the data type and content of the first response information or a data type and content of the third response information or a data type and content of the merged information, generating information in an image coding format according to the presented content, comparing the information in the image coding format with the second response information content, and taking the difference between the two as action response information content; and generating the action response according to the action response information content.

5. The method for processing the network resource access according to claim 1, wherein the processing method further comprises:
acquiring a first update for the first response initiated by the target network resource server; and
converting the first update to generate a corresponding second update for the second response information content, and transmitting to the user terminal.

6. The method for processing the network resource access according to claim 5, wherein converting the first update to generate a corresponding second update for the second response information content specifically comprises:
receiving the first update and acquiring first update information; presenting the first update information with a corresponding presentation tool according to the type of the target network resource or the data type and content of the first response information or a data type and content of the first update information, and generating information in an image coding format according to the presented content as second update information content; and generating the second update according to the second update information content;

or, receiving the first update and acquiring first update information; merging the first update information and the first response information, presenting the merged information with a corresponding presentation tool according to the type of the target network resource or the data type and content of the first response information or a data type and content of the first update information or a data type and content of the merged information, and generating information in an image coding format according to the presented content as second update information content; and generating the second update according to the second update information content;

or, receiving the first update and acquiring first update information; merging the first update information and the first response information, presenting the merged information with a corresponding presentation tool according to the type of the target network resource or the data type and content of the first response information or a data type and content of the first update information or a data type and content of the merged information, generating information in an image coding format according to the presented content, comparing the information in the image coding format with the second response information content, and taking the difference between the two as second update information content; and generating the second update according to the second update information content.

7. The method for processing the network resource access according to claim 1, wherein generating information in an image coding format according to the presented content specifically comprises:
drawing or projecting the presented content to form the information in the image coding format.

8. A method for processing network resource access, applied to a network resource server, comprising:
receiving a first access request for a target network resource, and generating a second access request corresponding to the first access request according to a preset corresponding relationship;
generating a first response according to the second access request;
converting the first response to generate information in an image coding format as second response information content;
generating a second response according to the second response information content as a response to the first access request, and transmitting to a user terminal;
acquiring a user action for the second response information initiated by a user through a user terminal;
converting the user action to generate a third access request;
converting a third response returned according to the third access request to generate an action response; and
transmitting the action response to the user terminal as a response to the user action;
wherein converting the first response to generate information in an image coding format specifically comprises: acquiring first response information, presenting the first response information with a corresponding presentation tool according to a type of the target network resource or a data type and content of the first response information, and generating the information in the image coding format according to presented content and
wherein converting the user action to generate a third access request specifically comprises:
capturing the user action and acquiring user action information;
simulating and executing the user action on the first response information presented by the corresponding presentation tool according to the user action information;
generating third access request information accord to a user action simulation result; and
generating the third access request according to the third access request information.

9. The method for processing the network resource access according to claim 8, wherein generating a second access request corresponding to the first access request according to a preset corresponding relationship specifically comprises:
acquiring first access request information; determining one or more of an actual address, request method and processing logic of the target network resource corresponding to the first access request according to a corresponding relationship determined by a system built-in, local administrator or third party configuration, and converting the first access request information according to the one or more items determined above to generate second access request information; and generating the second access request according to the second access request information;

or, after merging a plurality of associated sub-access requests in the first access request, acquiring merged request information; determining one or more of an actual address, request method and processing logic of the target network resource corresponding to the first access request according to a corresponding relationship determined by a system built-in, local administrator or third party configuration, and converting the merged request information according to the one or more items determined above to generate second access request information; and generating the second access request according to the second access request information;

or, acquiring first access request information; determining one or more of an actual address, request method and processing logic of the target network resource corresponding to the first access request according to a corresponding relationship determined by a system built-in, local administrator or third party configuration, converting the first access request information according to the one or more items determined above, and decomposing the converted information to obtain second access request information containing a plurality of pieces of associated sub-access request information; and generating the second access request according to the second access request information.

10. The method for processing the network resource access according to claim 8, wherein the user action information comprises an action type and an action position.

11. The method for processing the network resource access according to claim 8, wherein converting a third response returned according to the third access request to generate an action response specifically comprises:

acquiring third response information; presenting the third response information with a corresponding presentation tool according to the type of the target network resource or the data type and content of the first response information or a data type and content of the third response information, and generating information in an image coding format according to the presented content as action response information content; and generating the action response according to the action response information content;

or, acquiring third response information; merging the third response information and the first response information, presenting the merged information with a corresponding presentation tool according to the type of the target network resource or the data type and content of the first response information or a data type and content of the third response information or a data type and content of the merged information, and generating information in an image coding format according to the presented content as action response information content; and generating the action response according to the action response information content;

or, acquiring third response information; merging the third response information and the first response information, presenting the merged information with a corresponding presentation tool according to the type of the target network resource or the data type and content of the first response information or a data type and content of the third response information or a data type and content of the merged information, generating information in an image coding format according to the presented content, comparing the information in the image coding format with the second response information content, and taking the difference between the two as action response information content; and generating the action response according to the action response information content.

12. The method for processing the network resource access according to claim 8, wherein the processing method further comprises:

converting the first update for the first response to generate a corresponding second update for the second response information content, and transmitting to the user terminal.

13. The method for processing the network resource access according to claim 12, wherein converting the first update for the first response to generate a corresponding second update for the second response information content specifically comprises:

after acquiring first update information, presenting the first update information with a corresponding presentation tool according to the type of the target network resource or the data type and content of the first response information or a data type and content of the first update information, and generating information in an image coding format according to the presented content as second update information content; and generating the second update according to the second update information content;

or, after acquiring first update information, merging the first update information and the first response information, presenting the merged information with a corresponding presentation tool according to the type of the target network resource or the data type and content of the first response information or a data type and content of the first update information or a data type and content of the merged information, and generating information in an image coding format according to the presented content as second update information content; and generating the second update according to the second update information content;

or, after acquiring first update information, merging the first update information and the first response information, presenting the merged information with a corresponding presentation tool according to the type of the target network resource or the data type and content of the first response information or a data type and content of the first update information or a data type and content of the merged information, generating information in an image coding format according to the presented content, comparing the information in the image coding format with the second response information content, and taking the difference between the two as second update information content; and generating the second update according to the second update information content.

14. The method for processing the network resource access according to claim 8, wherein generating information in an image coding format according to the presented content specifically comprises:

drawing or projecting the presented content to form the information in the image coding format.

15. A method for processing network resource access, applied to a user terminal, comprising:
- receiving a first access request for a target network resource, generating a second access request corresponding to the first access request according to a preset corresponding relationship, and transmitting to a target network resource server;
- receiving a first response returned by the target network resource server according to the second access request, and converting the first response to generate information in an image coding format as second response information content; and
- generating a second response according to the second response information content as a response to the first access request;
- acquiring a user action for the second response information initiated by a user through a user terminal;
- converting the user action to generate a third access request, and transmitting to the target network resource server; and
- converting a third response returned by the target network resource server according to the third access request to generate an action response as a response to the user action;
- wherein converting the first response to generate information in an image coding format specifically comprises: acquiring first response information, presenting the first response information with a corresponding presentation tool according to a type of the target network resource or a data type and content of the first response information, and generating the information in the image coding format according to presented content; and
- wherein converting the user action to generate a third access request specifically comprises:
- capturing the user action and acquiring user action information;
- simulating and executing the user action on the first response information presented by the corresponding presentation tool according to the user action information;
- generating third access request information according to a user action simulation result; and
- generating the third access request according to the third access request information.

16. The method for processing the network resource access according to claim 15, wherein generating a second access request corresponding to the first access request according to a preset corresponding relationship specifically comprises:
- acquiring first access request information; determining one or more of an actual address, request method and processing logic of the target network resource corresponding to the first access request according to a corresponding relationship determined by a system built-in, local administrator or third party configuration, and converting the first access request information according to the one or more items determined above to generate second access request information; and generating the second access request according to the second access request information;
- or, after merging a plurality of associated sub-access requests in the first access request, acquiring merged request information; determining one or more of an actual address, request method and processing logic of the target network resource corresponding to the first access request according to a corresponding relationship determined by a system built-in, local administrator or third party configuration, and converting the merged request information according to the one or more items determined above to generate second access request information; and generating the second access request according to the second access request information;
- or, acquiring first access request information; determining one or more of an actual address, request method and processing logic of the target network resource corresponding to the first access request according to a corresponding relationship determined by a system built-in, local administrator or third party configuration, converting the first access request information according to the one or more items determined above, and decomposing the converted information to obtain second access request information containing a plurality of pieces of associated sub-access request information; and generating the second access request according to the second access request information.

17. The method for processing the network resource access according to claim 15, wherein the user action information comprises an action type and an action position.

18. The method for processing the network resource access according to claim 15, wherein converting a third response returned by the target network resource server according to the third access request to generate an action response specifically comprises:
- receiving the third response and acquiring third response information; presenting the third response information with a corresponding presentation tool according to the type of the target network resource or the data type and content of the first response information or a data type and content of the third response information, and generating information in an image coding format according to the presented content as action response information content; and generating the action response according to the action response information content;
- or, receiving the third response and acquiring third response information; merging the third response information and the first response information, presenting the merged information with a corresponding presentation tool according to the type of the target network resource or the data type and content of the first response information or a data type and content of the third response information or a data type and content of the merged information, and generating information in an image coding format according to the presented content as action response information content; and generating the action response according to the action response information content;
- or, receiving the third response and acquiring third response information; merging the third response information and the first response information, presenting the merged information with a corresponding presentation tool according to the type of the target network resource or the data type and content of the first response information or a data type and content of the third response information or a data type and content of the merged information, generating information in an image coding format according to the presented content, comparing the information in the image coding format with the second response information content, and taking the difference between the two as action response information content; and generating the action response according to the action response information content.

19. The method for processing the network resource access according to claim 15, wherein the processing method further comprises:
- acquiring a first update for the first response initiated by the target network resource server; and
- converting the first update to generate a corresponding second update for the second response information content.

20. The method for processing the network resource access according to claim 19, wherein converting the first update to generate a corresponding second update for the second response information content specifically comprises:
- receiving the first update and acquiring first update information; presenting the first update information with a corresponding presentation tool according to the type of the target network resource or the data type and content of the first response information or a data type and content of the first update information, and generating information in an image coding format according to the presented content as second update information content; and generating the second update according to the second update information content;
- or, receiving the first update and acquiring first update information; merging the first update information and the first response information, presenting the merged information with a corresponding presentation tool according to the type of the target network resource or the data type and content of the first response information or a data type and content of the first update information or a data type and content of the merged information, and generating information in an image coding format according to the presented content as second update information content; and generating the second update according to the second update information content;
- or, receiving the first update and acquiring first update information; merging the first update information and the first response information, presenting the merged information with a corresponding presentation tool according to the type of the target network resource or the data type and content of the first response information or a data type and content of the first update information or a data type and content of the merged information, generating information in an image coding format according to the presented content, comparing the information in the image coding format with the second response information content, and taking the difference between the two as second update information content; and generating the second update according to the second update information content.

21. The method for processing the network resource access according to claim 15, wherein generating information in an image coding format according to the presented content specifically comprises:
- drawing or projecting the presented content to form the information in the image coding format.

* * * * *